(12) United States Patent
Karout et al.

(10) Patent No.: US 10,454,641 B2
(45) Date of Patent: Oct. 22, 2019

(54) LISTEN BEFORE TALK FOR REFERENCE SIGNALS IN MIMO SYSTEMS

(71) Applicant: Telefonaktiebolaget LM Ericsson (publ), Stockholm (SE)

(72) Inventors: Johnny Karout, Göteborg (SE); Themistoklis Charalambous, Göteborg (SE); Gabor Fodor, Hässelby (SE); L. Srikar Muppirisetty, Göteborg (SE); Henk Wymeersch, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 192 days.

(21) Appl. No.: 15/500,613

(22) PCT Filed: Nov. 16, 2016

(86) PCT No.: PCT/EP2016/077860
§ 371 (c)(1),
(2) Date: Jan. 31, 2017

(87) PCT Pub. No.: WO2018/091081
PCT Pub. Date: May 24, 2018

(65) Prior Publication Data
US 2018/0241522 A1  Aug. 23, 2018

(51) Int. Cl.
*H04L 5/00* (2006.01)
*H04B 7/0413* (2017.01)
*H04W 74/08* (2009.01)

(52) U.S. Cl.
CPC ......... *H04L 5/0048* (2013.01); *H04B 7/0413* (2013.01); *H04L 5/0073* (2013.01); *H04W 74/0816* (2013.01); *H04W 74/0825* (2013.01)

(58) Field of Classification Search
CPC ... H04B 7/0413; H04L 5/0048; H04L 5/0073; H04L 5/0062; H04W 74/0816; H04W 75/0825; H04W 74/0825
See application file for complete search history.

(56) References Cited

U.S. PATENT DOCUMENTS 6,223,040 B1 * 4/2001 Dam .................... H04B 7/2693
370/337
2005/0226140 A1 * 10/2005 Zhuang .................... H04B 1/69
370/203

(Continued)

FOREIGN PATENT DOCUMENTS

CN      107889140 A  *  4/2018  .......... H04L 5/0051
EP      2037601 A1      3/2009

(Continued)

OTHER PUBLICATIONS

3rd Generation Partnership Project. Technical Specification Group Radio Access Network; Study on elevation beamforming / Full-Dimension (FD) Multiple Input Multiple Output (MIMO) for LTE (Release 13); 3GPP TR 36.897 V13.0.0; Jun. 2015; pp. 1-58; Sophia Antipolis, Valbonne, France.

*Primary Examiner* — Un C Cho
*Assistant Examiner* — Shah M Rahman
(74) *Attorney, Agent, or Firm* — Sage Patent Group

(57) ABSTRACT

According to certain embodiments, a method in a first wireless device (10A) comprises determining (100) an intended pilot sequence that the first wireless device (10A) intends to send to an access node (20), determining (112-116) whether another wireless device (10B; 10N) is using a similar pilot sequence, and transmitting (122) the intended pilot sequence to the access node (20) in a next available time instance in response to a determination that another wireless device (10B, 10N) is not using the similar pilot sequence.

36 Claims, 15 Drawing Sheets

(56) References Cited

U.S. PATENT DOCUMENTS

| | | | | |
|---|---|---|---|---|
| 2008/0268887 A1* | 10/2008 | Jansen | .................... | H04B 7/022 455/503 |
| 2008/0285526 A1* | 11/2008 | Gorokhov | ............ | H04B 1/7075 370/338 |
| 2009/0124204 A1* | 5/2009 | Howard | ............... | H04B 1/7117 455/59 |
| 2012/0113974 A1* | 5/2012 | Zhu | ....................... | H04L 5/0048 370/344 |
| 2012/0170444 A1 | 7/2012 | Ogawa et al. | | |
| 2013/0010833 A1* | 1/2013 | Ogawa | ................. | H04J 11/0023 375/138 |
| 2013/0059583 A1* | 3/2013 | Van Phan | ............. | H04W 72/04 455/435.1 |
| 2014/0369311 A1* | 12/2014 | Bi | ........................ | H04B 7/0452 370/330 |
| 2014/0370904 A1* | 12/2014 | Smith | ................... | H04W 8/005 455/450 |
| 2015/0229459 A1* | 8/2015 | Ashikhmin | ........... | H04L 5/0032 370/278 |
| 2015/0304090 A1* | 10/2015 | Ko | ......................... | H04B 7/024 370/329 |
| 2015/0326290 A1 | 11/2015 | Harrison et al. | | |
| 2016/0329998 A1* | 11/2016 | Li | ......................... | H04L 5/0048 |
| 2017/0019238 A1* | 1/2017 | Sharma | ..................... | H04L 5/14 |
| 2017/0078067 A1* | 3/2017 | Sun | ....................... | H04W 16/02 |
| 2017/0104568 A1* | 4/2017 | Nasiri Khormuji | . | H04B 7/0413 |
| 2017/0111147 A1* | 4/2017 | Cao | ..................... | H04L 27/2613 |
| 2017/0208588 A1 | 7/2017 | Park et al. | | |
| 2018/0077688 A1* | 3/2018 | Yi | ......................... | H04W 16/14 |
| 2018/0110057 A1* | 4/2018 | Park | ....................... | H04W 72/12 |
| 2018/0255586 A1* | 9/2018 | Einhaus | ................ | H04W 74/08 |

FOREIGN PATENT DOCUMENTS

| | | | | |
|---|---|---|---|---|
| EP | 3169029 A1 | | 5/2017 | |
| JP | 2008028977 A | * | 2/2008 | .......... H04L 5/0051 |
| WO | 2015113238 A1 | | 8/2015 | |
| WO | 2016006890 A1 | | 1/2016 | |

\* cited by examiner

LISTEN BEFORE TALK FOR REFERENCE SIGNALS IN MIMO SYSTEMS

TECHNICAL FIELD

Certain embodiments of the present disclosure relate, in general, to wireless communications networks and, more specifically, to listen before talk procedures for reference signals in multiple-input multiple-output (MIMO) systems.

BACKGROUND

Although multiple-input multiple-output (MIMO) systems up to 8 or 16 antennas are supported by existing standards as so-called MIMO transmission modes, the use of very large antenna arrays (also called "massive" or "full dimension" MIMO systems) in commercial cellular systems have been proposed only recently. The $3^{rd}$ Generation Partnership Project (3GPP) is currently working on the implications of supporting up to 64 transceiver units (TXRU) to serve many users simultaneously, commonly called multiuser MIMO, and/or to provide both energy efficiency and beamforming gain by creating narrow (pencil) beams when serving the scheduled users. See e.g., 3GPP TR 36.897 V13.0.0 (2015-06). In addition, 802.11 technologies aim at supporting an increasing number of antennas.

Full dimension MIMO systems are expected to increase spectral efficiency and capacity. In addition, full dimension MIMO systems are expected to provide a more uniform user experience compared to conventional MIMO systems in which the received user bit rate and/or quality of service can vary greatly depending on whether the user is located at the cell center or the cell edge. The underlying theory of full dimension MIMO systems is that under the assumption of perfect channel estimation, the vector channel of a served user grows orthogonal to other users and thereby intracell and intercell interference can be virtually eliminated.

Channel state information (CSI) acquisition presents a challenge for successful implementation of full dimension MIMO systems. In full dimension MIMO systems, the number of antennas at the access node (in the order of 100 to 1000) is assumed to be much larger than that of the served users (in the order of 10 to 20). Therefore, to limit the CSI acquisition overhead and complexity, full dimension MIMO was originally proposed for time-division duplexing (TDD) systems in which the CSI acquisition overhead is proportional to the number of antennas of co-scheduled (multi-user MIMO) users rather than the number of antennas at the access node. CSI acquisition in TDD systems is done by sending uplink pilot sequences by the users to the access node and performing channel estimation at the access node, e.g., a base station (BS) or an eNodeB (eNB) or a gNode (gNB). Pilot sequences are also often referred to as reference signals. Note that pilot sequences can be scarce resources, for example, when the coherent time/frequency resources are limited as compared with the co-scheduled multi-user (MU) MIMO users, because the length (corresponding to the number of symbols) of pilot sequences is limited by the coherence time and bandwidth of the wireless channel. In turn, the number of orthogonal pilot sequences, and thereby the number of separable users, is limited by the length of the available pilot sequences.

Because in reciprocity based full dimension MIMO systems the number of served users is much larger than that in conventional MIMO systems, pilot sequences must be reused in neighboring cells. This results in channel estimation error at the access node because of the interference generated by the users in the neighboring cells using the same or non-orthogonal pilot sequences. Such interference in full dimension MIMO systems (which, in contrast to intracell and intercell interference, is not eliminated as the number of antennas at the access node grows large) is known as reference signal interference or, in other words, pilot contamination. CSI estimation error due to pilot contamination at the access node degrades the performance in terms of actually achieved spectral efficiency, beam forming gains, receiver performance (e.g., in terms of bit error rate (BER)) and cell edge user throughput.

Summarizing, pilot sequence reuse in neighbor cells can result in pilot contamination. A technique to avoid pilot sequence reuse in neighbor cells may rely on using separation of the pilot sequences in the code domain (similar to higher frequency reuse schemes known in GSM systems). However, using separation in the code domain may be inefficient. For example, using separation in the code domain may require allocating more symbols for pilot sequence construction, which means fewer symbols can be used for user data transmission.

It is desirable to provide easy and efficient measures which may enable an accurate channel estimation.

SUMMARY

According to an embodiment of the present disclosure, a method in a first wireless device is disclosed. The method comprises determining an intended pilot sequence that the first wireless device intends to send to an access node, determining whether another wireless device is using a similar pilot sequence, and transmitting the intended pilot sequence or a different pilot sequence to the access node. The intended pilot sequence is transmitted in a next available time instance in response to a determination that another wireless device is not using the similar pilot sequence. The intended pilot sequence is not transmitted in the next available time instance in response to a determination that another wireless device is using the similar pilot sequence.

According to an embodiment of the present disclosure, a first wireless device is disclosed. The first wireless device comprises a memory and one or more processors. The one or more processors are operable to determine an intended pilot sequence that the first wireless device intends to send to an access node, to determine whether another wireless device is using a similar pilot sequence, and to transmit the intended pilot sequence or a different pilot sequence to the access node. The intended pilot sequence is transmitted in a next available time instance in response to a determination that another wireless device is not using the similar pilot sequence. The intended pilot sequence is not transmitted in the next available time instance in response to a determination that another wireless device is using the similar pilot sequence. In certain embodiments, a similar pilot sequence is the same as or non-orthogonal to the intended pilot sequence.

In certain embodiments, determining whether another wireless device is using the similar pilot sequence comprises monitoring one or more channels that other wireless devices use for transmitting pilot sequences, detecting the pilot sequences used by the other wireless devices, and determining whether any of the detected pilot sequences match the similar pilot sequence. As an example, in certain embodiments, the monitoring is performed in response to receiving information from the access node indicating that the similar pilot sequence is among a set of one or more pilot sequences that are potentially being used by other wireless devices.

In certain embodiments, transmitting the intended pilot sequence or a different pilot sequence to the access node comprises, in response to determining that another wireless device is using the similar pilot sequence, transmitting the different pilot sequence and not transmitting the intended pilot sequence. In certain embodiments, the different pilot sequence is constructed prior to determining that another wireless device is using the similar pilot sequence. In other embodiments, the different pilot sequence is constructed after determining that another wireless device is using the similar pilot sequence and the first wireless device obtains, from the access node, information to construct the different pilot sequence. In certain embodiments, the wireless device is further operable to monitor one or more channels that other wireless devices use for transmitting pilot sequences in order to detect the pilot sequences used by the other wireless devices. In these embodiments, the wireless device is operable to send information about the detected pilot sequences to the access node and to receive, from the access node, information to construct the different pilot sequence in order for the different pilot sequence to be different from the detected pilot sequences.

In certain embodiments, transmitting the intended pilot sequence or a different pilot sequence to the access node comprises, in response to determining that another wireless device is using the similar pilot sequence, waiting to transmit the intended pilot sequence until after a pre-determined time period has elapsed.

In certain embodiments, the first wireless device is configured for time division duplexing using a half-duplex configuration. Prior to transmitting the intended pilot sequence or a different pilot sequence to the access node, the first wireless device monitors one or more channels that other wireless devices use for transmitting pilot sequences in order to determine whether another wireless device is using the similar pilot sequence.

In certain embodiments, the first wireless device is configured for time division duplexing using a full duplex configuration. The first wireless device transmits the intended pilot sequence while simultaneously monitoring one or more channels that other wireless devices use for transmitting pilot sequences in order to determine whether another wireless device is using the similar pilot sequence. In response to a determination that another wireless device is using the similar pilot sequence, the intended pilot sequence is not transmitted in a next available time instance.

In certain embodiments, determining whether another wireless device is using the intended pilot sequence comprises receiving an indication from the access node that the intended pilot sequence is not being used by another wireless device and therefore the first wireless device need not monitor channels that other wireless devices use for transmitting pilot sequences.

According to an embodiment of the present disclosure, a method in an access node is disclosed. The method comprises receiving, from a first wireless device, a request for the access node to assist the first wireless device in determining an intended pilot sequence to transmit to the access node, and sending, to the first wireless device, assistance information that assists the first wireless device in determining the intended pilot sequence.

According to an embodiment of the present disclosure, an access node is disclosed. The access node comprises a memory and one or more processors operable to receive, from a first wireless device, a request for the access node to assist the first wireless device in determining an intended pilot sequence to transmit to the access node, and to send, to the first wireless device, assistance information that assists the first wireless device in determining the intended pilot sequence.

In certain embodiments, the assistance information comprises information to construct the intended pilot sequence.

In certain embodiments, the request comprises one or more detected pilot sequences that the first wireless device has detected as being used by other wireless devices, and the assistance information allows the wireless device to construct the intended pilot sequence to be different from the detected pilot sequences.

In certain embodiments, the access node is further operable to monitor one or more channels that other wireless devices use for transmitting pilot sequences, to detect the pilot sequences used by the other wireless devices, and to include, in the assistance information, information that enables the first wireless device to avoid using as the intended pilot sequence any of the pilot sequences that the access node has detected as being used by other wireless devices.

In certain embodiments, the assistance information indicates that the first wireless device need not monitor the one or more channels that the other wireless devices use for transmitting pilot sequences.

In certain embodiments, the assistance information comprises information about a set of one or more pilot sequences that the access node has detected as being used by other wireless devices and an indication that, if the intended pilot sequence is in the set, the first wireless device should monitor the one or more channels that the other wireless devices use for transmitting pilot sequences to determine whether the intended pilot sequence is being used by another wireless device.

According to an embodiment of the present disclosure, a computer program product is disclosed. The computer program product comprises a non-transitory computer readable storage medium having computer readable program code embodied in the medium that, when executed by a processor of a first wireless device, causes the first wireless device to perform operations. The operations comprise determining an intended pilot sequence that the first wireless device intends to send to an access node, determining whether another wireless device is using a similar pilot sequence, and transmitting the intended pilot sequence or a different pilot sequence to the access node. In response to a determination that another wireless device is not using the similar pilot sequence, the intended pilot sequence is transmitted in a next available time instance. In response to a determination that another wireless device is using the similar pilot sequence, the intended pilot sequence is not transmitted in the next available time instance.

According to an embodiment of the present disclosure, a computer program embodied on a non-transitory computer readable storage medium is disclosed. The computer program comprises computer readable program code for determining an intended pilot sequence that the first wireless device intends to send to an access node, computer readable program code for determining whether another wireless device is using a similar pilot sequence, and computer readable program code for transmitting the intended pilot sequence or a different pilot sequence to the access node. In response to a determination that another wireless device is not using the similar pilot sequence, the intended pilot sequence is transmitted in a next available time instance. In response to a determination that another wireless device is using the similar pilot sequence, the intended pilot sequence is not transmitted in the next available time instance.

According to an embodiment of the present disclosure, a computer program product is disclosed. The computer program product comprises a non-transitory computer readable storage medium having computer readable program code embodied in the medium that, when executed by a processor of an access node, causes the access node to perform operations. The operations comprise receiving a request for the access node to assist a first wireless device in determining an intended pilot sequence to transmit to the access node, and sending assistance information to the first wireless device. The assistance information assists the first wireless device in determining the intended pilot sequence.

According to an embodiment of the present disclosure, a computer program embodied on a non-transitory computer readable storage medium is disclosed. The computer program comprises computer readable program code for receiving a request for an access node to assist a first wireless device in determining an intended pilot sequence to transmit to the access node, and computer readable program code for sending assistance information to the first wireless device. The assistance information assists the first wireless device in determining the intended pilot sequence.

Certain embodiments of the present disclosure may provide one or more technical advantages. Certain embodiments may avoid the likelihood of pilot sequence reuse occurring in neighbor cells and thereby mitigate pilot contamination and its negative impact on channel estimation. As an example, certain embodiments may mitigate interference on reference signals (pilot contamination) in MU MIMO systems without the need of introducing higher than 1 pilot sequence reuse schemes. By enabling a full pilot reuse scheme in the multiple cells of a multicell MU MIMO systems, fewer symbols might need to be used for pilot sequence construction and thereby more symbols can be used for user data transmission. Embodiments of the present disclosure may provide some, none, or all of these technical advantages. Other technical advantages will be apparent to persons of ordinary skill in the art.

BRIEF DESCRIPTION

DETAILED DESCRIPTION

Certain embodiments may reduce or eliminate the likelihood of pilot sequence reuse occurring in neighbor cells.

In general, one embodiment of a first wireless device may use its receiver to detect signals transmitted by other wireless devices, e.g., during uplink time frames of the first wireless device. The detection can be performed either when the first wireless device is not transmitting (e.g., if the first wireless device is operating in a half-duplex configuration) or at the same time that the first wireless device is transmitting (e.g., if the first wireless device has full-duplex capability). Detecting signals transmitted by other wireless devices may allow the first wireless device to determine whether another wireless device is using the pilot sequence that the first wireless device intends to use. Obtaining such information may allow the first wireless device to either back-off (e.g., not send the intended pilot sequence or postpone the transmission of the intended pilot sequence) or to obtain a new pilot sequence (e.g., via a request to the access node) in order to avoid any interference. In short, the first wireless device may use a modified clear channel assessment (CCA) or listen before talk (LBT) type of procedure with respect to pilot signal transmission. As noted above, pilot signals are also often called reference signals.

As an example, in certain embodiments, a wireless device that intends to use a pilot sequence may monitor uplink frames to detect whether a similar pilot sequence is being used by another wireless device. If so, the wireless device can back-off (e.g., wait to use the pilot sequence), request a new pilot sequence, and/or report to the access node a set of pilot sequences that the wireless device detected as being used (so that the access node can assign an appropriate pilot sequence to the wireless device). Example embodiments are further described with reference to FIGS. 1-12 below, wherein like numerals are used to indicate like and corresponding parts of the various figures. In this disclosure, the wireless device may be referred to interchangeably as a user equipment (UE), and the access node may be referred to interchangeably as a base station or eNodeB (eNB). The access node may also be embodied in a gNode (gNB).

Figure 1:
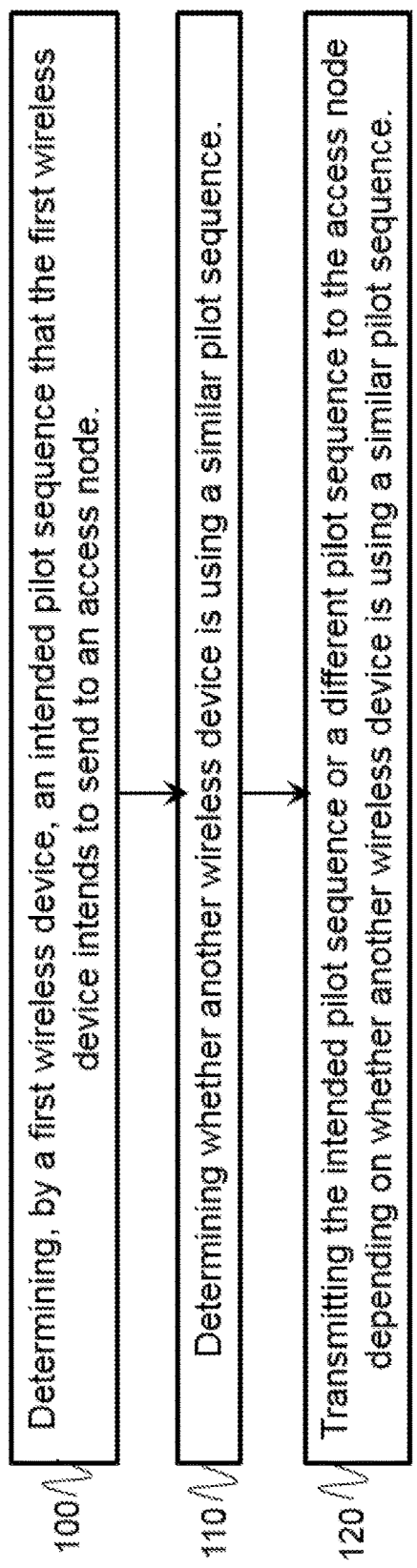
FIG. 1 is a flow chart illustrating an example embodiment in which a wireless device transmits an intended pilot sequence or a different pilot sequence to an access node depending on whether another wireless device is using a pilot sequence similar to the intended pilot sequence.

FIG. 1 is a flow chart illustrating an example embodiment in which a first wireless device 10A transmits an intended pilot sequence or a different pilot sequence to an access node 20 depending on whether another wireless device (10B, 10C, . . . 10N) is using a pilot sequence similar to the intended pilot sequence. The wireless devices (10B, 10C, . . . 10N) can be either in the same cell as the first wireless device 10A or in different cells, such as neighboring cells for which transmissions from wireless devices 10B, 10C . . . 10N could interfere with transmissions from the first wireless device 10A. At step 100, the first wireless device 10A determines an intended pilot sequence (A) that the first wireless device 10A intends to send to access node 20. Any suitable method may be used to determine the intended pilot sequence. As an example, the intended pilot sequence (A) may be determined based in part on (a) a cell identity and/or other information provided by access node 20, and (b) wireless device 10A's own identity. Access node 20 may provide the cell identity and/or other information according to known procedures (e.g., the access node may broadcast its cell ID to wireless devices 10 within its coverage area) and/or according to procedures for providing assistance information disclosed herein (e.g., as discussed below with respect to FIGS. 5-7).

At step 110, the first wireless device 10A determines whether another wireless device (10B, 10C, . . . 10N) is using a similar pilot sequence to wireless device 10A's intended pilot sequence (A). A pilot sequence may be considered similar to the intended pilot sequence (A) if the access node is unable to reliably distinguish the pilot sequence from the intended pilot sequence (A). In other words, a similar pilot sequence can refer to a pilot sequence that creates more than a pre-determined amount of interference for the intended pilot sequence (A). As an example, a similar pilot sequence is the same as or non-orthogonal to the intended pilot sequence. In certain embodiments, orthogonal sequences may refer to sequences that are independent in a mathematical sense in that their scalar product is zero (or close to zero) implying that when such sequences are transmitted as physical signals, they do not interfere with one another (or that interference will be minimal).

Figure 6:
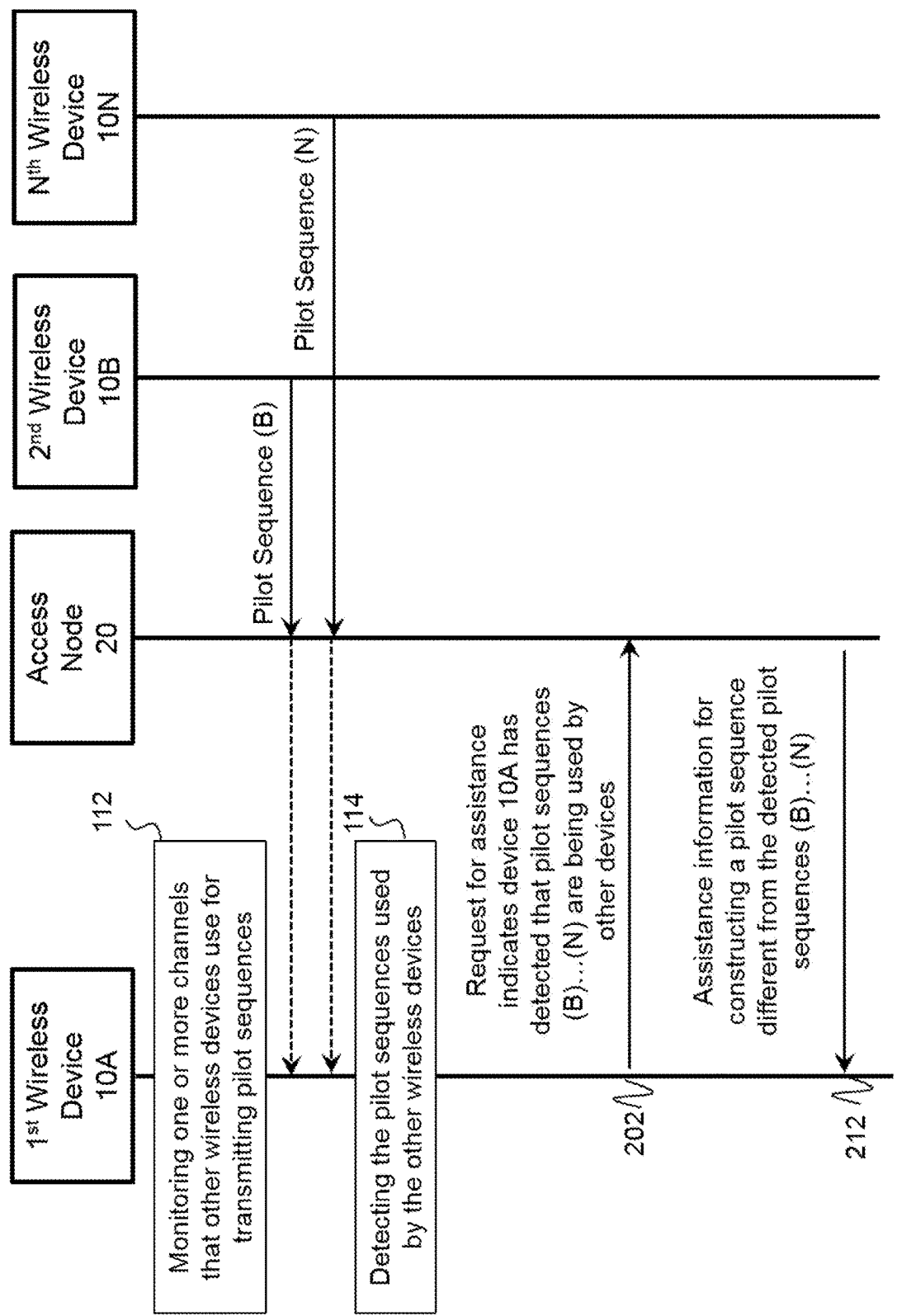
FIG. 6 is a signal diagram illustrating an example embodiment in which the access node uses information about pilot sequences detected by the first wireless device in order to determine the assistance information.
Figure 7:
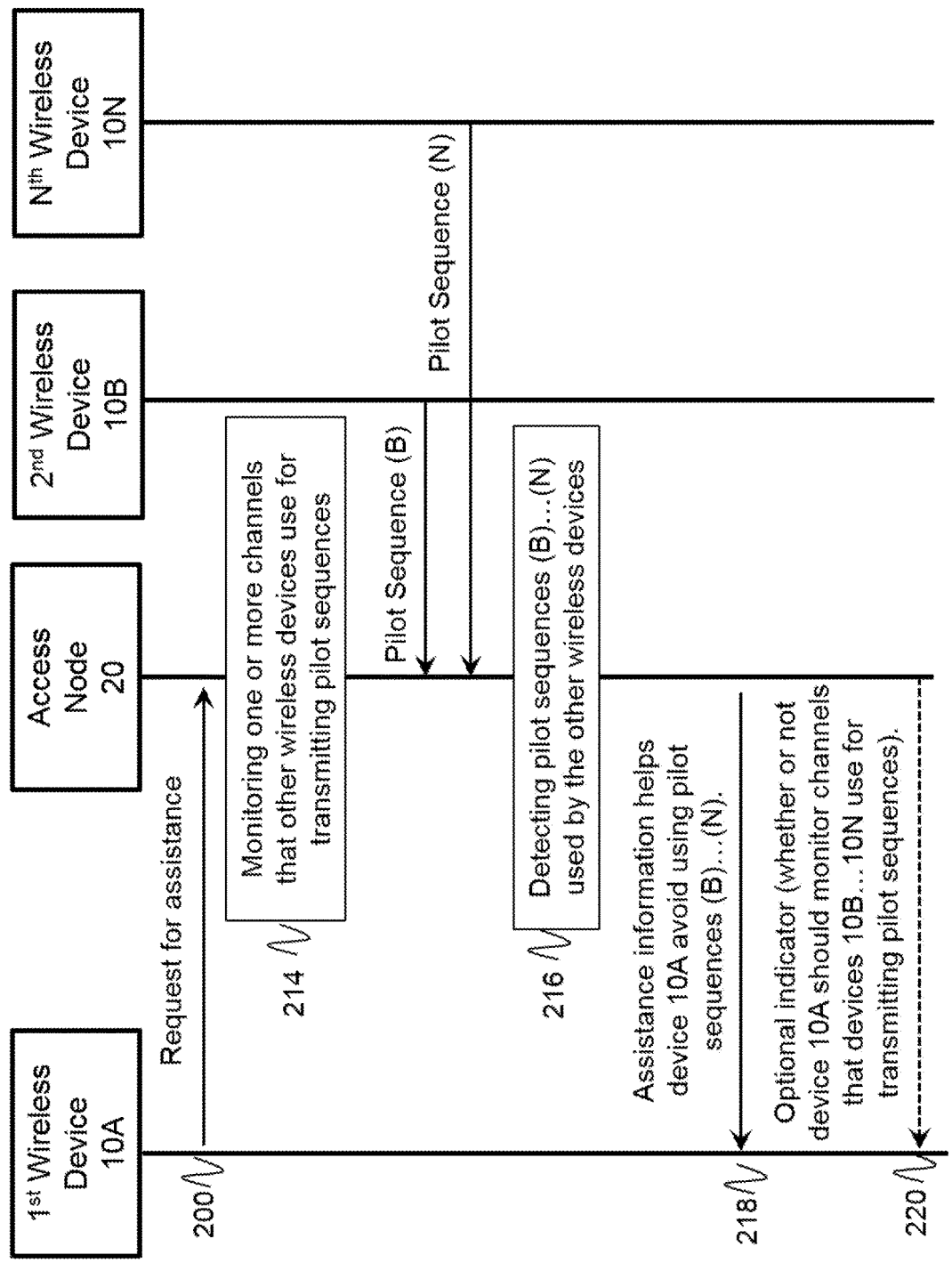
FIG. 7 is a signal diagram illustrating an example embodiment in which the access node uses information about pilot sequences detected by the access node in order to determine the assistance information.

As used herein, pilot sequences (A) and (A') refer to pilot sequences that are similar to the intended pilot sequence (A), and pilot sequences (B), (N), and (X) refer to pilot sequences that are different from the intended pilot sequence (A). As further discussed below, first wireless device 10A can determine whether another wireless device (10B, 10C, . . . 10N) is using a similar pilot sequence based on monitoring one or more channels that other wireless devices use for transmitting pilot sequences (see e.g., FIGS. 2A-4B at steps 112-116), based on information that access node 20 provides to first wireless device 10A (see e.g., FIG. 7 at step 218), or both (see e.g., FIG. 6 at steps 112-212; FIG. 7 at steps 218-220).

At step 120, first wireless device 10A transmits the intended pilot sequence or a different pilot sequence to access node 20 depending on whether another wireless device is using a similar pilot sequence. As an example, in certain embodiments, a method in first wireless device 10A comprises determining (step 100) an intended pilot sequence (A) that the first wireless device 10A intends to send to an access node 20; performing a channel sensing operation to determine (step 110) whether another wireless device (e.g., 10B, 10C, or 10N) is using the intended pilot sequence; and transmitting (step 120) the intended pilot sequence (A) in response to a determination that another wireless device (e.g., 10B, 10C, or 10N) is not using the intended pilot sequence (A). Additional examples are described with respect to FIGS. 2A-4B below.

Figure 2A:
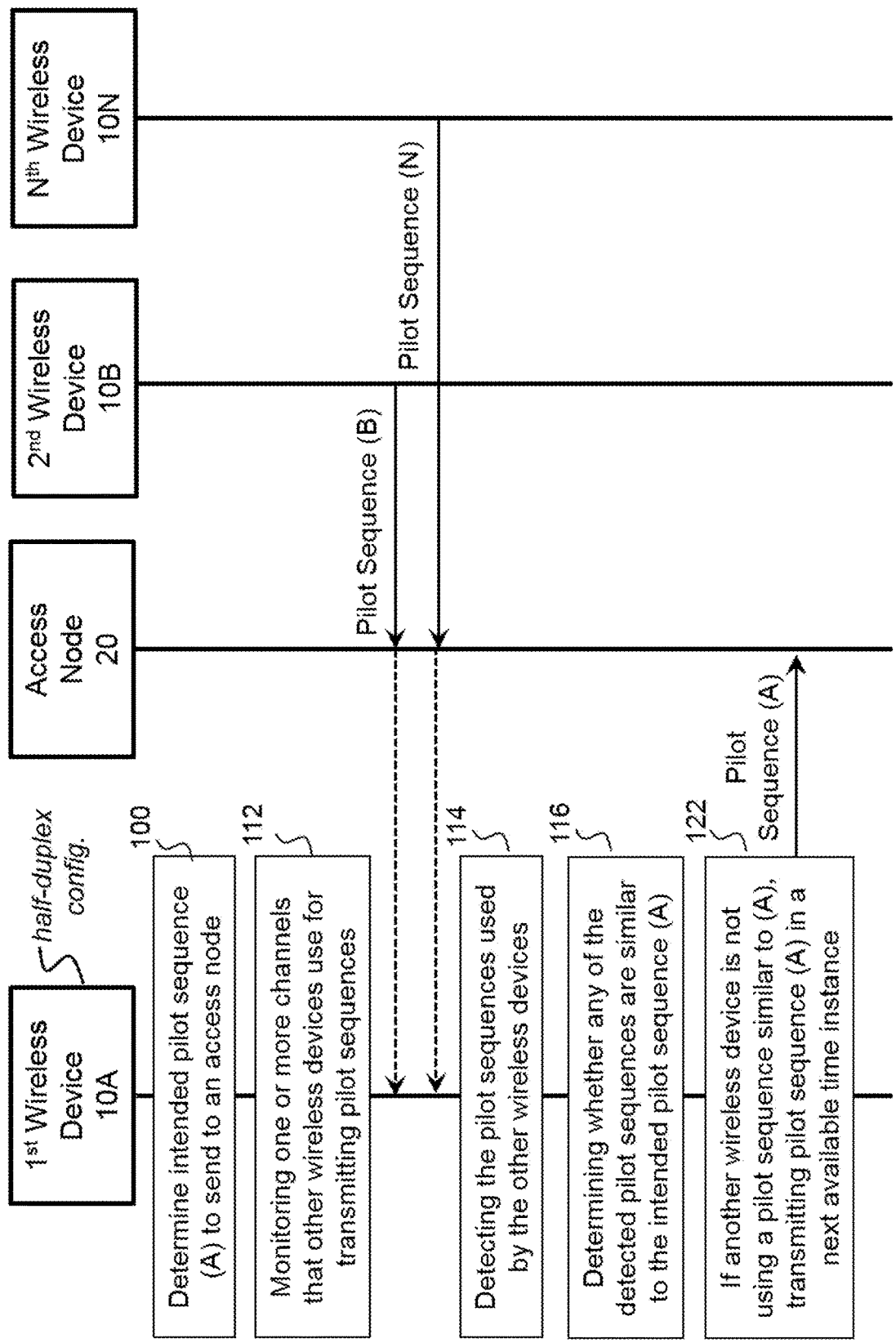
FIGS. 2A-2B are signal diagrams illustrating example embodiments in which, in response to determining that another wireless device is not using the similar pilot sequence, the first wireless device transmits the intended pilot sequence. The wireless device may be configured for half-duplex operation (FIG. 2A) or full-duplex operation (FIG. 2B).
Figure 2B:
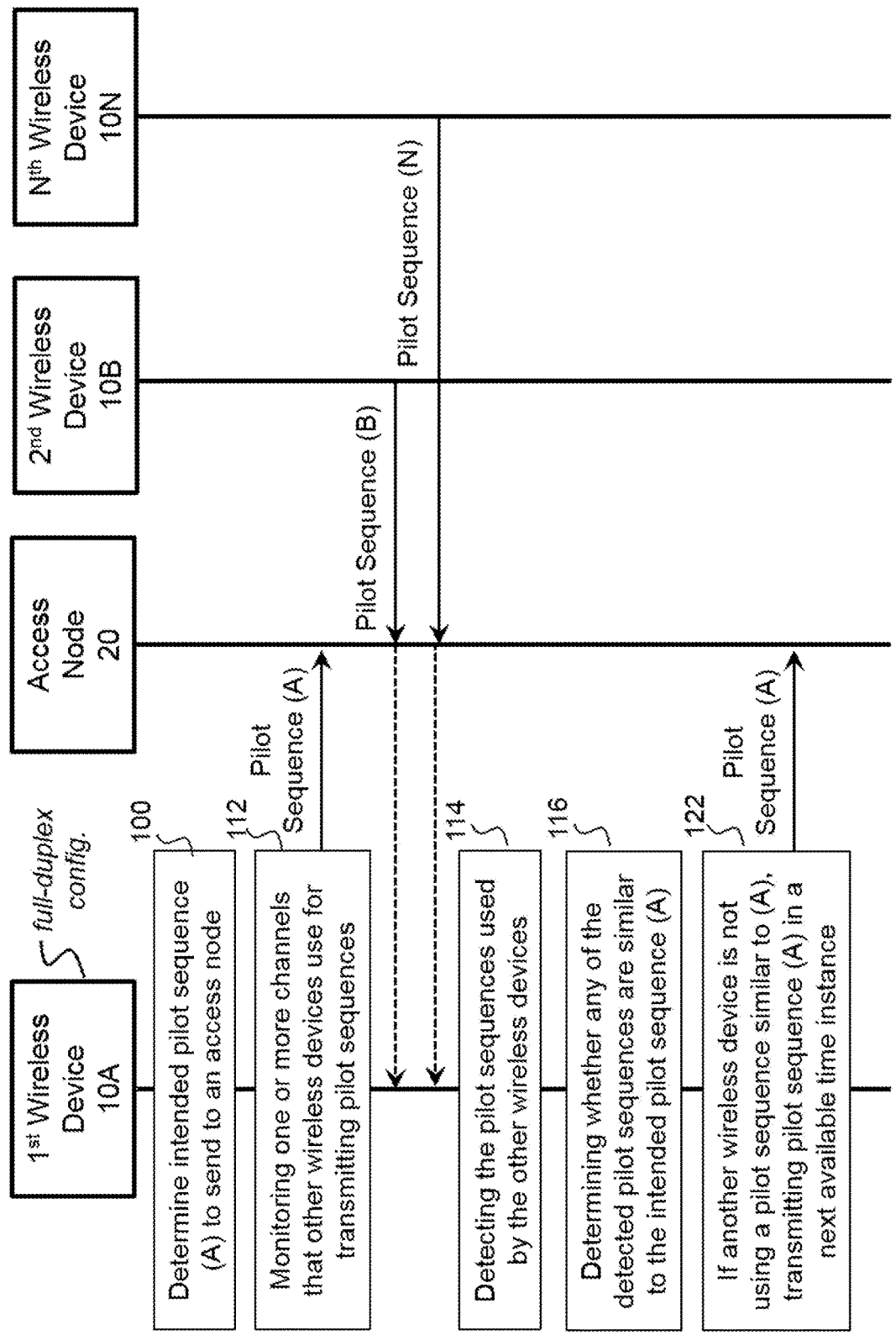

FIGS. 2A-2B are signal diagrams illustrating example embodiments in which, in response to determining that another wireless device is not using the similar pilot sequence, the first wireless device 10A transmits the intended pilot sequence (A). The method begins at step 100, where the first wireless device 10A determines the intended pilot sequence (A) that the first wireless device 10A intends to send to an access node 20. The first wireless device 10A then determines whether another wireless device (10B or 10N) is using a similar pilot sequence, as shown in steps 112-116.

At step 112 the first wireless device 10A monitors one or more channels that other wireless devices (10B, 10C . . . and/or 10N) use for transmitting pilot sequences. The first wireless device 10A may perform the monitoring step 112 according to a configuration setting, in response to a pre-determined rule, such as a rule that provides conditions or events that trigger the monitoring, or in response to information or an instruction from access node 20 that triggers the monitoring. As an example, FIG. 7 below describes an embodiment in which the monitoring is performed in response to receiving information from access node 20 indicating that the similar pilot sequence (A) or (A') is among a set of one or more pilot sequences that are potentially being used by other wireless devices.

In certain embodiments, the monitoring in step 112 may comprise performing a channel sensing operation to detect pilot sequence transmissions from other wireless devices 10 within range of the first wireless device 10A's receiver. The first wireless device 10A may monitor any suitable channel(s). For example, a channelized system can use multiple frequencies for communications. The first wireless device 10A can monitor/sense just one channel or several channels depending on capability and configuration. As an example, an LTE system deployed in 5 MHz bandwidth would see 25 physical resource blocks (PRB) in the frequency domain, which can be considered 25 channels (assuming a PRB is 180 kHz, and accounting for some guard channels, etc.).

At step 114, the first wireless device 10A detects the pilot sequences (B) and (N) used by the other wireless devices 10B and 10N. At step 116, the first wireless device 10A determines whether any of the detected pilot sequences (B) and (N) match one or more pilot sequences that are similar to the intended pilot sequence (A). In the example shown in FIGS. 2A-2B, the pilot sequences (B) and (N) that first wireless device 10A has detected from other devices do not match pilot sequences (A) or (A') and therefore are not similar to the intended pilot sequence (A). Thus, the first wireless device 10A determines that another wireless device is not using the similar pilot sequence (A) or (A'), as shown in step 116. In response to the determination, first wireless device 10A transmits the intended pilot sequence (A) in a next available time instance, as shown in step 122.

Figure 3A:
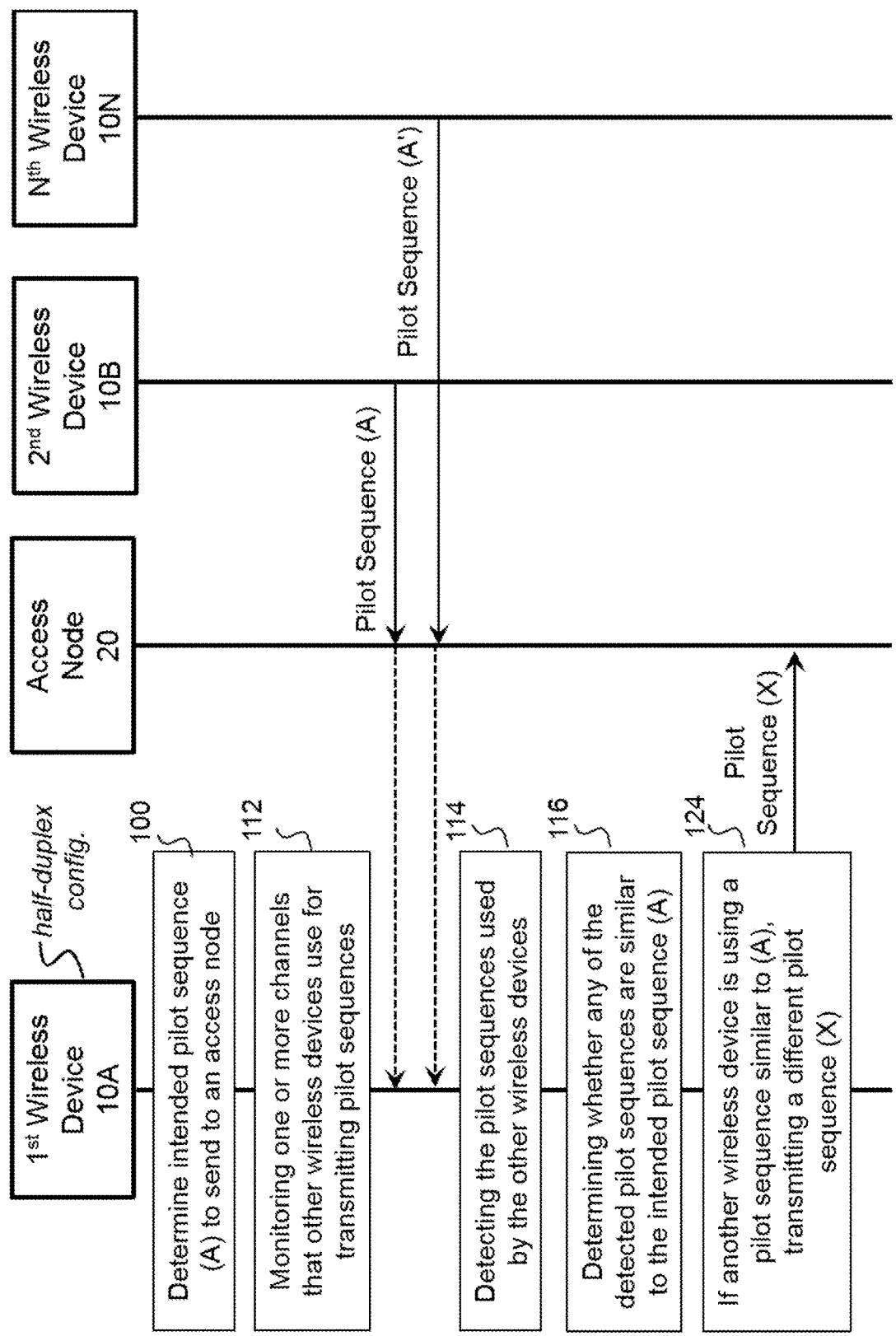
FIGS. 3A-3B are signal diagrams illustrating example embodiments in which, in response to determining that another wireless device is using the similar pilot sequence, the first wireless device transmits the different pilot sequence. The wireless device may be configured for half-duplex operation (FIG. 3A) or full-duplex operation (FIG. 3B).
Figure 3B:
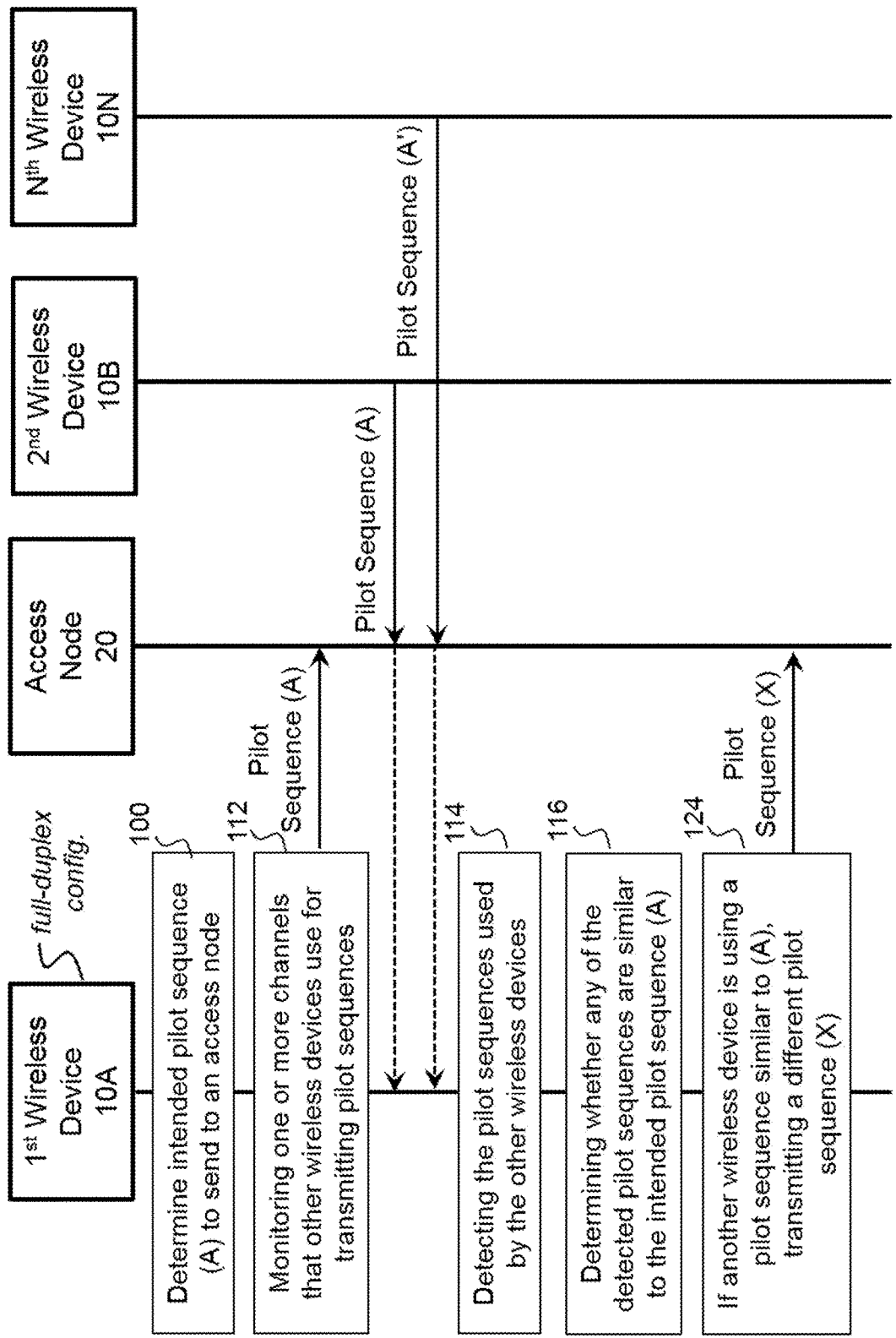

FIGS. 3A-3B are signal diagrams illustrating example embodiments in which, in response to determining that another wireless device is using the similar pilot sequence (A) or (A'), the first wireless device 10A transmits the different pilot sequence (X). Steps 100 and 112 are similar to the analogous steps in FIGS. 2A-2B. At step 114, the first wireless device 10A detects the pilot sequences (A) and (A') used by the other wireless devices 10B and 10N, respectively. At step 116, the first wireless device 10A determines whether any of the detected pilot sequences (A) and (A') match one or more pilot sequences that are similar to the intended pilot sequence (A). In the example shown in FIGS. 3A-3B, the pilot sequences (A) and (A') that first wireless device 10A has detected from other devices match pilot sequences (A) or (A') and therefore are similar to the intended pilot sequence (A). Thus, the first wireless device 10A determines that another wireless device is using the similar pilot sequence (A) or (A'), as shown in step 116.

Although the example shows the first wireless device 10A detecting two similar pilot sequences, (A) and (A'), either sequence would be sufficient to detect a match. For example, if wireless device 10B transmitted similar pilot sequence (A) and wireless device 10N transmitted different pilot sequence (N), the first wireless device 10A would still determine that another wireless device (10B) is using the similar pilot sequence (A). As another example, if wireless device 10B transmitted different pilot sequence (B) and wireless device 10N transmitted similar pilot sequence (A'), the first wireless device 10A would still determine that another wireless device (10N) is using the similar pilot sequence (A').

In response to a determination that another wireless device is using the similar pilot sequence, the first wireless device 10A does not transmit the intended pilot sequence (A) in the next available time instance. Instead, the first wireless device 10A transmits a different pilot sequence (X), as shown in step 124. The first wireless device 10A can construct the different pilot sequence (X) either prior to determining that another wireless device is using the similar pilot sequence (e.g., prior to step 116) or after determining that another wireless device is using the similar pilot sequence (e.g., after step 116). For example, in certain embodiments, the first wireless device 10A may send access node 20 information about the pilot sequences (A) and (A') detected in step 114, and access node 20 may respond with assistance information that assists the first wireless device 10A in constructing pilot sequence (X) that is different from the detected pilot sequences (A) and (A'). An example is illustrated in FIG. 6.

Figure 4A:
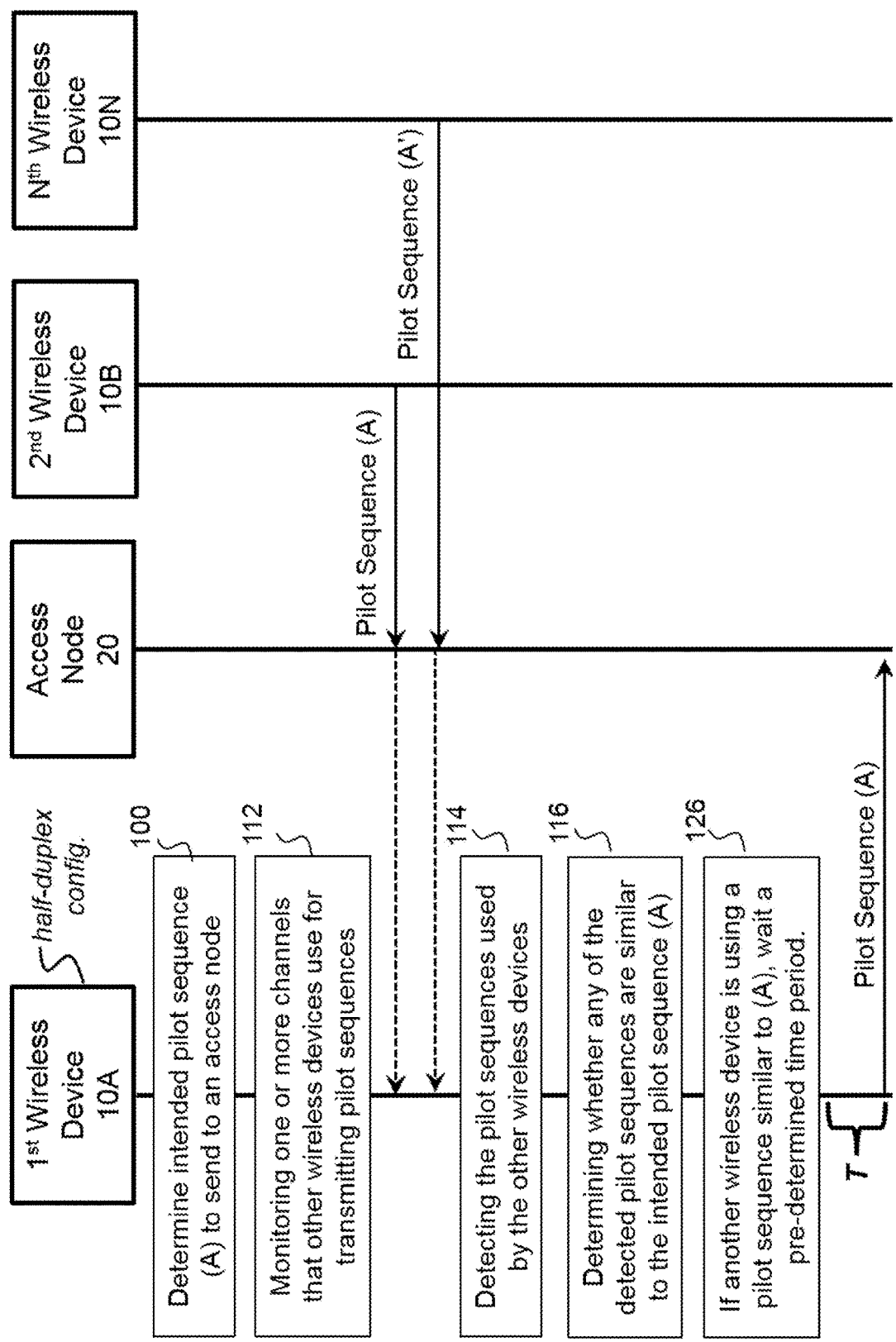
FIGS. 4A-4B are signal diagrams illustrating example embodiments in which, in response to determining that another wireless device is using the similar pilot sequence, the first wireless device waits for a time period to elapse before transmitting the intended pilot sequence. The wireless device may be configured for half-duplex operation (FIG. 4A) or full-duplex operation (FIG. 4B).
Figure 4B:
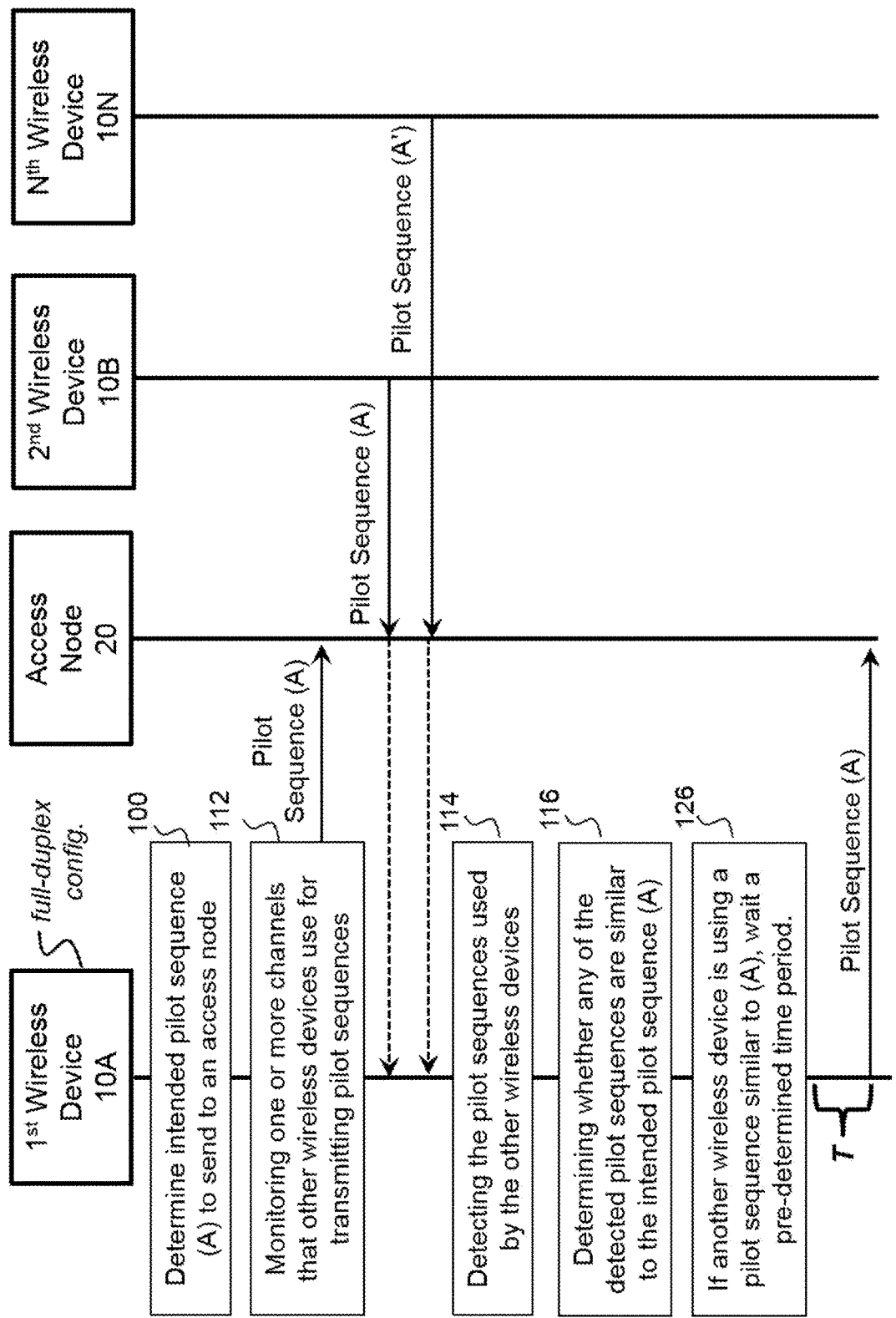

FIGS. 4A-4B are signal diagrams illustrating example embodiments in which, in response to determining that another wireless device is using the similar pilot sequence (A) or (A'), the first wireless device 10A waits for a time period (T) to elapse before transmitting the intended pilot sequence (A). Steps 100 and 116 are similar to the analogous steps in FIGS. 3A-3B. In response to a determination that another wireless device (10B and/or 10N) is using the similar pilot sequence (A) or (A'), the first wireless device 10A does not transmit the intended pilot sequence (A) in the next available time instance. Instead, the first wireless device 10A waits to transmit the intended pilot sequence until after the pre-determined time period (T) has elapsed, as shown in step 126. Time period (T) may be any suitable time period, such as a time period configured to increase the likelihood that the other wireless device 10B and/or 10N has stopped transmitting the similar pilot sequence (A) or (A') or has moved out of interference range.

In certain embodiments, the first wireless device 10A is configured for time division duplexing using a half-duplex configuration, as shown in each of FIGS. 2A, 3A, and 4A. In half-duplex configuration, the first wireless device 10A is equipped with a receiver that can receive signals transmitted by an access node 20 during downlink (DL) time frames. The same receiver can receive signals transmitted by other wireless devices 10B . . . 10N during uplink (UL) time frames. This device capability is supported by, for example, the Release-12 of the 3GPP standards on the sidelink procedures. In half-duplex configuration, the first wireless device 10A is not capable of simultaneously transmitting its own uplink pilot signal while receiving uplink pilot signals of other wireless devices. Thus, in half-duplex configuration, prior to transmitting the intended pilot sequence (A) or a different pilot sequence (X) to access node 20 (e.g., prior to steps 122, 124, or 126), the first wireless device 10A monitors the one or more channels that other wireless devices use for transmitting pilot sequences in order to determine whether another wireless device is using the similar pilot sequence (see steps 112-116).

In other embodiments, the first wireless device 10A is configured for time division duplexing using a full duplex configuration, as shown in each of FIGS. 2B, 3B, and 4B. In the case that the first wireless device 10A supports full-duplex communication, transmitting and receiving can happen simultaneously. As a result, the first wireless device 10A can simultaneously transmit its own uplink pilot signal while receiving uplink pilot signals of other wireless devices. Thus, in full-duplex configuration, the first wireless device 10A transmits the intended pilot sequence (A) while simultaneously monitoring one or more channels that other wireless devices use for transmitting pilot sequences, as shown in step 112. If the first wireless device 10A determines that another wireless device is using the similar pilot sequence (A) and (A'), the intended pilot sequence (A) is not transmitted in the next available time instance. That is, the first wireless device 10A stops transmitting the intended pilot sequence (A) and either transmits a different pilot sequence (X) (see e.g., step 124 of FIG. 3B) or waits for time period (T) to elapse before resuming transmitting the intended pilot sequence (A) (see e.g., step 126 of FIG. 4B0.

Figure 5:
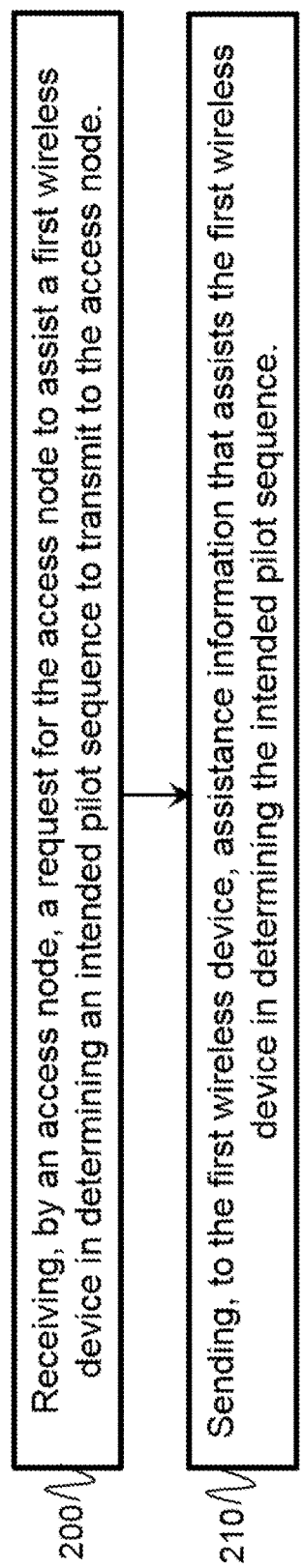
FIG. 5 is a flow chart illustrating an example embodiment in which the access node provides assistance information that assists the first wireless device in determining the intended pilot sequence.

FIG. 5 is a flow chart illustrating an example embodiment in which the access node 20 provides assistance information that assists the first wireless device 10A in determining an intended pilot sequence (A) that is different from the pilot sequences being used by other wireless devices 10B . . . 10N within the coverage area of access node 20. At step 200, access node 20 receives a request from the first wireless device 10A. The request asks access node 20 to assist the first wireless device 10A in determining an intended pilot sequence to transmit to access node 20. At step 210, access node 20 sends assistance information to the first wireless device 10A. The assistance information assists the first wireless device 10A in determining the intended pilot sequence. For example, the assistance information may comprise information that first wireless device can combine with other information (such as the first wireless device 10A's own identity) in order to construct the intended pilot sequence. FIGS. 6-7 provide further examples of access node 20 providing assistance information to the first wireless device 10A.

FIG. 6 is a signal diagram illustrating an example embodiment in which the access node 20 uses information about pilot sequences detected by the first wireless device 10A in order to determine the assistance information. Steps 112-114 may be similar to analogous steps described above with respect to FIGS. 2A-4B. In general, the first wireless device 10A monitors one or more channels that other wireless devices use for transmitting pilot sequences (step 112) and detects the pilot sequences (B), (N) used by the other wireless devices 106, 10N (step 114). At step 202, the first wireless device 10A sends access node 20 a request to assist the first wireless device 10A in determining an intended pilot sequence to transmit to access node 20. The request comprises one or more detected pilot sequences (B), (N) that the first wireless device has detected as being used by other wireless devices. At step 212, access node 20 sends assistance information to the first wireless device 10A that allows the first wireless device 10A to construct the intended pilot sequence (A) to be different from the detected pilot sequences (B) and (N).

FIG. 7 is a signal diagram illustrating an example embodiment in which the access node 20 uses information about pilot sequences (B), (N) detected by access node 20 in order to determine the assistance information. At step 200, access node 20 receives a request from the first wireless device 10A. The request asks access node 20 to assist the first wireless device 10A in determining an intended pilot sequence to transmit to access node 20. At step 214, access node 20 monitors one or more channels that other wireless devices (e.g., 10B, 10C, . . . 10N) use for transmitting pilot sequences. The monitoring in step 214 may comprise performing a channel sensing operation to detect pilot sequence transmissions from wireless devices 10 within range of access node 20's receiver. Access node 20's receiver may be able to detect transmissions that the first wireless device 10A's receiver would not be able to detect, for example, if the first wireless device 10A is on the opposite side of the cell from another wireless device (e.g., 10B, 10N) transmitting a pilot sequence that may interfere with the first wireless device 10A. Access node 20 can detect the pilot sequences used by the other wireless devices 10B and 10N (step 216) and include information in the assistance information that enables the first wireless device 10A to avoid using any of the pilot sequences (B) and (N) that access node 20 has detected as being used by other wireless devices 10B and 10N. In other words, the assistance information from access node 20 may allow the first wireless device 10A to determine/construct an intended pilot sequence (A) that is different from (e.g., non-orthogonal to) wireless device 10B's pilot sequences (B) and wireless device 10N's pilot sequence (N).

In certain embodiments, the first wireless device 10A may be configured to receive the assistance information of step 218 as an implicit indicator that the first wireless device 10A need not monitor the one or more channels that the other wireless devices use for transmitting pilot sequences (e.g., because the monitoring has already been performed by access node 20). In another embodiment, the assistance information that access node 20 sends the first wireless device 10A may comprise an indicator (step 220) that explicitly indicates that the first wireless device 10A need not perform the monitoring.

In certain alternative embodiments, the assistance information from access node 20 may indicate that the first wireless device 10A should perform monitoring. As an example, the assistance information (e.g., the information sent in step 218) may comprise information about a set of one or more pilot sequences (B), (N) that the access node 20 has detected as being used by other wireless devices 10, 10N and an indication (step 220) that, if the intended pilot sequence is in the set, the first wireless device 10A should monitor the one or more channels that the other wireless devices use for transmitting pilot sequences to determine whether the intended pilot sequence is being used by another wireless device. The information illustrated in steps 218 and 220 may be sent in separate messages (as illustrated) or in the same message. If access node 20 indicates that the first wireless device 10A should perform monitoring, the first wireless device 10A may proceed by performing any of the methods described above with respect to FIGS. 2A-4B.

Figure 8:
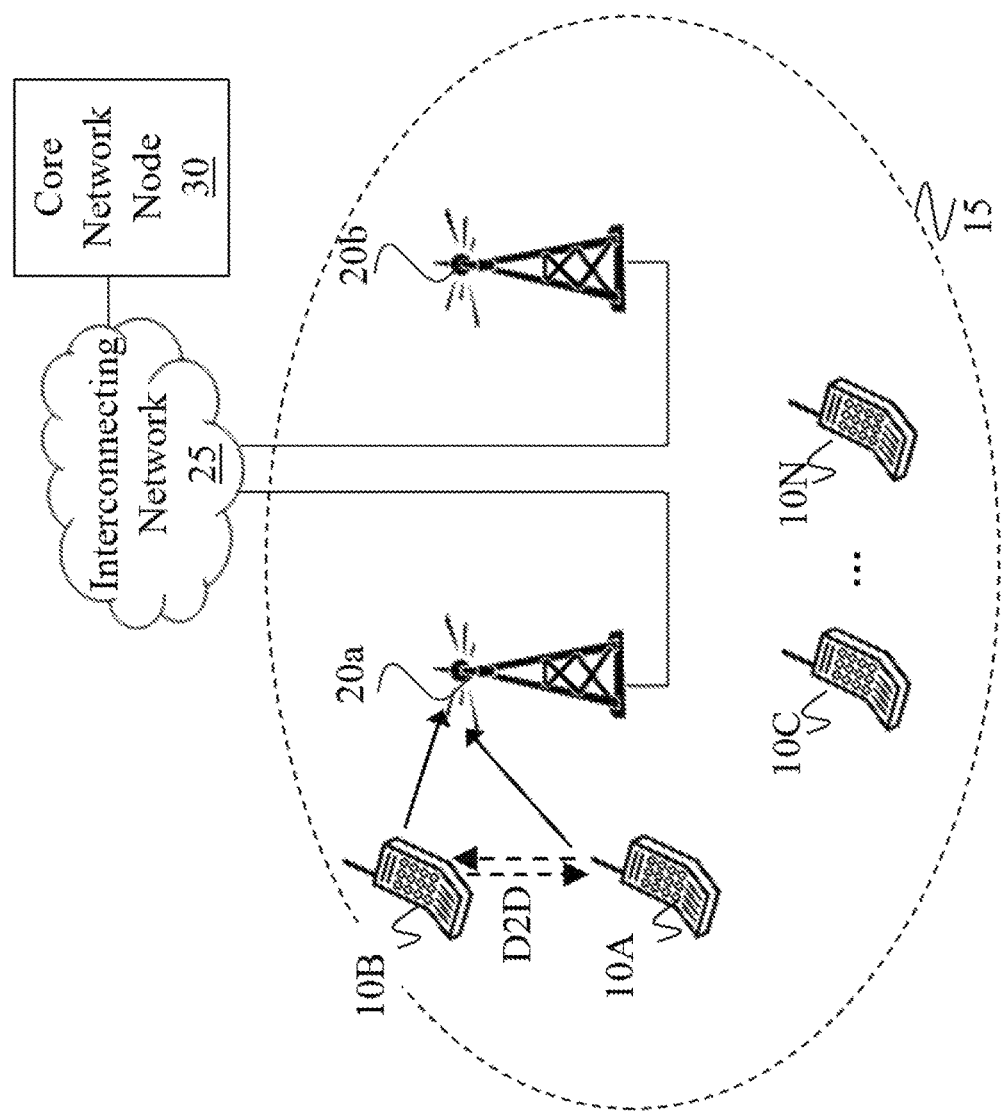
FIG. 8 is a block diagram illustrating an example wireless network, in accordance with certain embodiments.

FIG. 8 is a block diagram illustrating an example wireless network, in accordance with certain embodiments. The wireless network includes wireless devices 10A-110N (which may interchangeably be referred to by the non-limiting term user equipment, UE) and a plurality of network nodes, such as access nodes 20A-20B (e.g., eNBs, gNBs, base stations, etc.) and one or more core network nodes 30, which may communicate via an interconnecting network 25. Wireless devices 10 within coverage area 15 may each be capable of communicating directly with access nodes 20 over a wireless interface. In certain embodiments, wireless devices may also be capable of communicating with each other via device-to-device (D2D) communication.

As an example, wireless device 10A may communicate with access node 20A over a wireless interface. That is, wireless device 10A may transmit wireless signals and/or receive wireless signals from access node 20A. The wireless signals may contain voice traffic, data traffic, control signals, and/or any other suitable information. In some embodiments, an area of wireless signal coverage associated with a access node 20 may be referred to as a cell 15.

Wireless device 10 can be any type of wireless device capable of communicating with access nodes 20 or another wireless device/UE 10 over radio signals. Similarly, access node 20 can be any kind of access node capable of communicating with wireless device 10 or another network node. For example, the term network node may refer to access node 20, core network node 30, or even an external node (e.g., 3rd party node, a node external to the current network), etc. Example embodiments of wireless device 10 are described in more detail below with respect to FIGS. 9 and 11. Example embodiments of access node 20 are discussed below with respect to FIGS. 10 and 12.

In certain embodiments, access nodes 20 may interface with a radio network controller. The radio network controller may control access nodes 20 and may provide certain radio resource management functions, mobility management functions, and/or other suitable functions. In certain embodiments, the functions of the radio network controller may be included in access node 20. The radio network controller may interface with a core network node 30. In certain embodiments, the radio network controller may interface with the core network node 30 via an interconnecting network 25.

The interconnecting network 25 may refer to any interconnecting system capable of transmitting audio, video, signals, data, messages, or any combination of the preceding. The interconnecting network 125 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 30 may manage the establishment of communication sessions and various other functionalities for wireless devices 10. Examples of core network node 30 may include mobile switching center (MSC), MME, serving gateway (SGW), packet data network gateway (PGW), operation and maintenance (O&M), operations support system (OSS), SON, positioning node (e.g. Enhanced Serving Mobile Location Center, E-SMLC), MDT node, etc. Wireless devices 10 may exchange certain signals with the core network node using the non-access stratum layer. In non-access stratum signaling, signals between wireless devices 10 and the core network node 30 may be transparently passed through the radio access network. In certain embodiments, access nodes 20 may interface with one or more network nodes over an internode interface. For example, access nodes 20A and 20B may interface over an X2 interface.

Although FIG. 1 illustrates a particular arrangement of network 100, the present disclosure contemplates that the various embodiments described herein may be applied to a variety of networks having any suitable configuration. For example, the wireless network may include any suitable number of wireless devices 10 and access nodes 20, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data).

Figure 9:
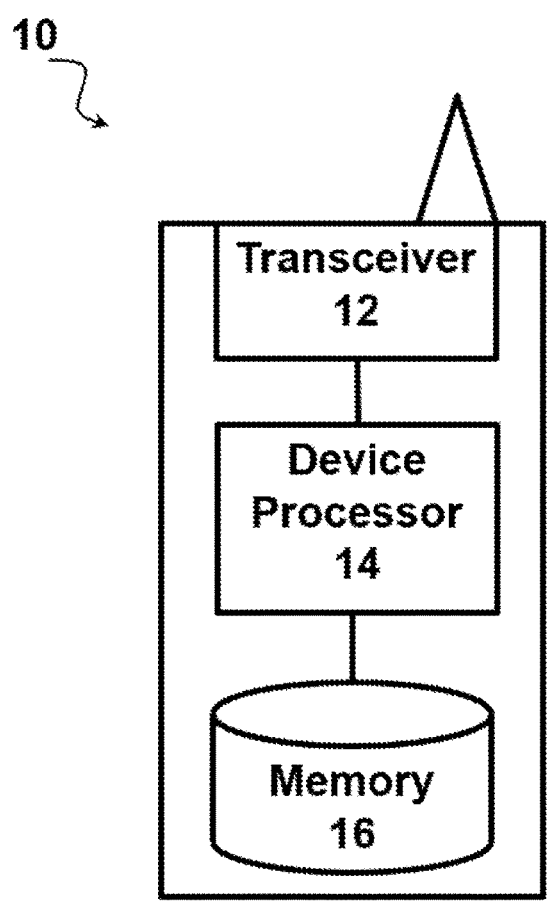
FIG. 9 is a block diagram of a wireless device, in accordance with certain embodiments of the present disclosure.

FIG. 9 is a block diagram of a wireless device 10, in accordance with certain embodiments of the present disclosure. Wireless device 10 can correspond, for example, to the wireless device 10A described above with respect to FIGS. 1 to 8. Wireless device 10 includes a transceiver 12, processor 14, and memory 16. The transceiver 12 may comprise receiver and transmitter capabilities as described above in conjunction with FIGS. 1 to 8. In some embodiments, the transceiver 12 facilitates transmitting wireless signals to and receiving wireless signals from access node 20 (e.g., via an antenna), the processor 14 executes instructions to provide some or all of the functionalities described above as being provided by wireless device 10, and the memory 16 stores the instructions for execution by the processor 14.

The processor 14 may include any suitable combination of hardware and software implemented in one or more modules to execute instructions and manipulate data to perform some or all of the described functions of wireless device 10, such as the functions of wireless device 10 described above. In some embodiments, the processor 14 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the processor 14 may comprise one or more of the modules discussed below with respect to FIG. 11.

The memory 16 is generally operable to store instructions, such as a computer program, software, an application including one or more of logic, rules, algorithms, code, tables, etc. and/or other instructions capable of being executed by a processor 14. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor of wireless device 10.

Other embodiments of wireless device 10 may include additional components beyond those shown in FIG. 9 that may be responsible for providing certain aspects of the wireless device's functionality, including any of the functionality described above and/or any additional functionality (including any functionality necessary to support the solution described above). As just one example, wireless device 10 may include input devices and circuits, output devices, and one or more synchronization units or circuits, which may be part of the processor. Input devices include mechanisms for entry of data into wireless device 10. For example, input devices may include input mechanisms, such as a microphone, input elements, a display, etc. Output devices may include mechanisms for outputting data in audio, video and/or hard copy format. For example, output devices may include a speaker, a display, etc.

Figure 10:
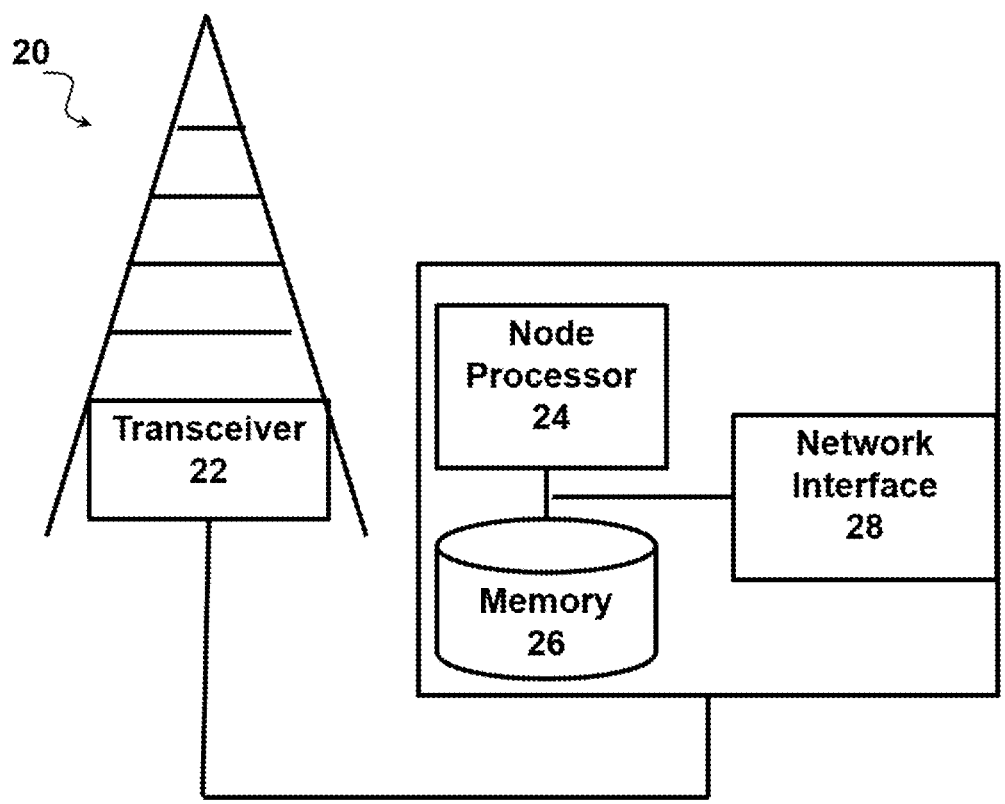
FIG. 10 is a block diagram of an access node, in accordance with certain embodiments of the present disclosure.

FIG. 10 is a block diagram of an access node 20, in accordance with certain embodiments of the present disclosure. Access node 20 may correspond to the access node 20 described above with respect to FIGS. 1 to 8. Access node 20 may include one or more of a transceiver 22, processor 24, memory 26, and network interface 28. The transceiver 22 may comprise receiver and transmitter capabilities as described above in conjunction with FIGS. 1 to 8. In some embodiments, the transceiver 22 facilitates transmitting wireless signals to and receiving wireless signals from wireless device 10 (e.g., via an antenna), the processor 24 executes instructions to provide some or all of the functionalities described above as being provided by access node 20, the memory 26 stores the instructions for execution by the processor 24, and the network interface 28 communicates signals to backend network components, such as a gateway, switch, router, Internet, Public Switched Telephone Network (PSTN), core network nodes 30 or radio network controllers, etc.

The processor 24 may include any suitable combination of hardware and software implemented in one or more modules to execute instructions and manipulate data to perform some or all of the described functions of access node 20, such as those described above. In some embodiments, the processor 24 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the processor 24 may comprise one or more of the modules discussed below with respect to FIG. 12.

The memory 26 is generally operable to store instructions, such as a computer program, software, an application including one or more of logic, rules, algorithms, code, tables, etc. and/or other instructions capable of being executed by a processor 24. Examples of memory 26 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 28 is communicatively coupled to the processor 24 and may refer to any suitable device operable to receive input for access node 20, send output from access node 20, perform suitable processing of the input or output or both, communicate to other devices, or any combination of the preceding. The network interface 28 may include appropriate hardware (e.g., port, modem, network interface card, etc.) and software, including protocol conversion and data processing capabilities, to communicate through a network.

Other embodiments of access node 20 may include additional components beyond those shown in FIG. 10 that may be responsible for providing certain aspects of the access node's functionality, including any of the functionality described above and/or any additional functionality (including any functionality necessary to support the solutions described above). The various different types of access nodes may include components having the same physical hardware but configured (e.g., via programming) to support different radio access technologies, or may represent partly or entirely different physical components.

Processors 24, interfaces 22 and/or 28, and memory 26 similar to those described with respect to FIG. 10 may be included in other network nodes (such as core network node 10). Other network nodes may optionally include or not include a wireless interface (such as the transceiver 22 described in FIG. 10).

Figure 11:
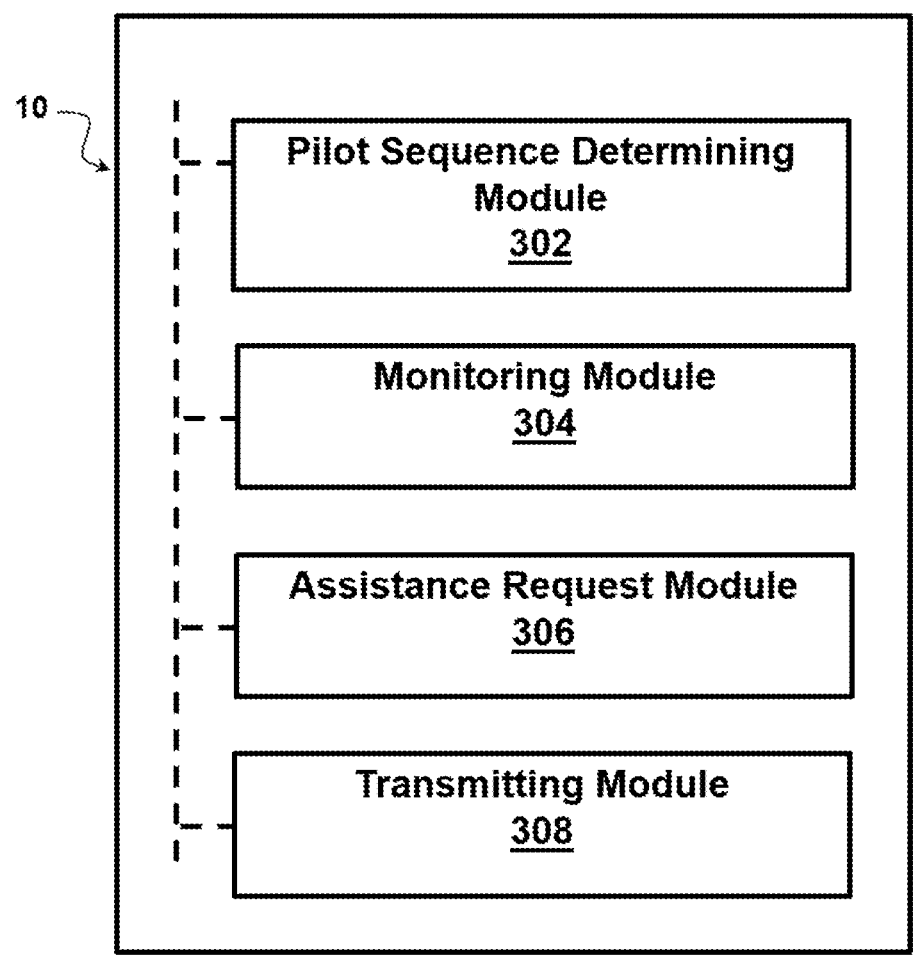
FIG. 11 is a block diagram illustrating examples of modules that may be included in a wireless device, in accordance with certain embodiments of the present disclosure.

FIG. 11 is a block diagram illustrating examples of modules that may be included in a wireless device 10, in accordance with certain embodiments of the present disclosure. The wireless device may correspond to the first wireless device described above with respect to FIGS. 1 to 8. In certain embodiments, wireless device 10 may include any one or more of: pilot sequence determining module 302, monitoring module 304, assistance request module 306, transmitting module 308, and/or other suitable modules. The functionality of the modules may be integrated in a single component or separated among several components in any suitable manner. In certain embodiments, one or more of the modules may be implemented using one or more processors 14 described with respect to FIG. 9.

In general, pilot sequence determining module 302 determines an intended pilot sequence that the first wireless device 10A intends to send to an access node 20. Monitoring module 304 determines whether another wireless device (10B, 10C, . . . or 10N) is using a similar pilot sequence. As an example, monitoring module 304 monitors one or more channels that other wireless devices (103, 10C, . . . or 10N) use for transmitting pilot sequences, detects the pilot sequences used by the other wireless devices (10B, 10C, . . . or 10N), and determines whether any of the detected pilot sequences match the similar pilot sequence. Transmitting module 308 transmits the intended pilot sequence or a different pilot sequence to the access node 20. For example, in response to a determination that another wireless device is not using the similar pilot sequence, the intended pilot sequence is transmitted in a next available time instance. Alternatively, in response to a determination that another wireless device is using the similar pilot sequence, the intended pilot sequence is not transmitted in the next available time instance. Rather, transmitting module 308 can transmit the intended pilot sequence according to a backoff procedure that waits a pre-determined time period before transmitting, or transmitting module 308 can transmit a different pilot sequence. In certain embodiments, assistance request module 306 requests access node 20 to provide assistance in determining an intended pilot sequence to transmit to the access node 20 and receives assistance information that assists the first wireless device 10A in determining the intended pilot sequence. In certain embodiments, the request may include information about pilot sequences that monitoring module 304 has detected as being used by other wireless devices (10B, 100, . . . or 10N).

Figure 12:
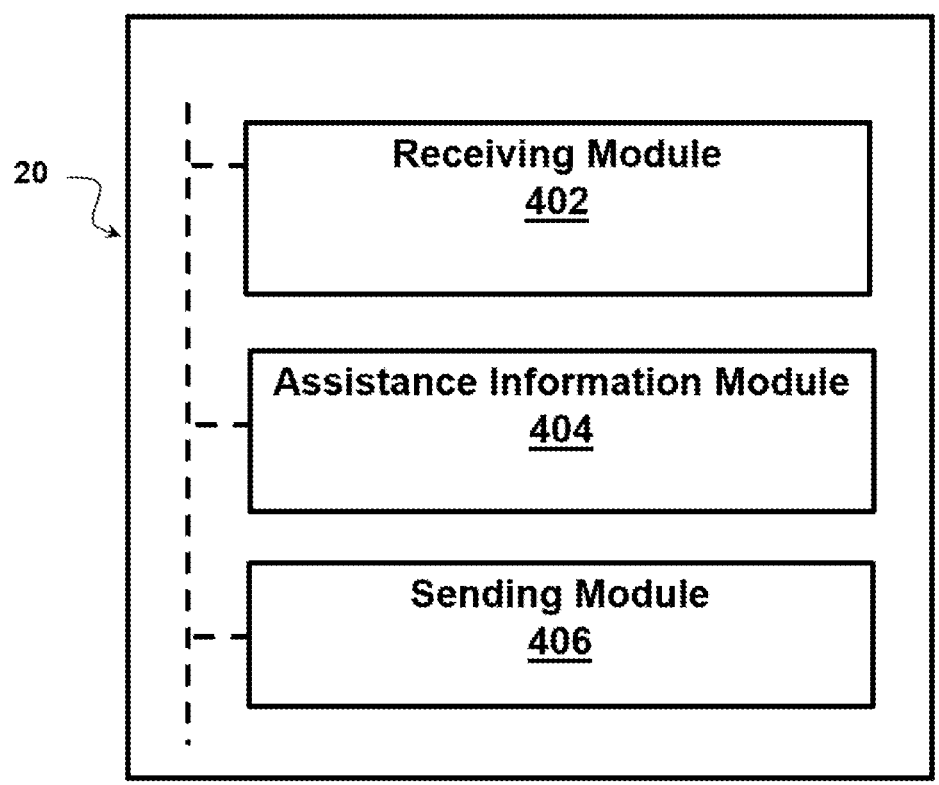
FIG. 12 is a block diagram illustrating examples of modules that may be included in an access node, in accordance with certain embodiments of the present disclosure.

FIG. 12 is a block diagram illustrating examples of modules that may be included in an access node 20, in accordance with certain embodiments of the present disclosure. The access node 20 may correspond to the access node 20 described above with respect to FIGS. 1 to 8. In certain embodiments, access node 20 may include any one or more of: receiving module 402, assistance information module 404, sending module 406, and/or other suitable modules. The functionality of the modules may be integrated in a single component or separated among several components in any suitable manner. In certain embodiments, one or more of the modules may be implemented using one or more processors 24 described with respect to FIG. 10.

In general, receiving module 402 may receive requests to assist a wireless device 10 in determining an intended pilot sequence to transmit to access node 20. Receiving module 402 may receive the requests in any suitable format. For example, the request may or may not include information about pilot sequences that the wireless device 10 has detected as being used by other wireless devices. Receiving module 402 may provide assistance information module 404 with the request. Assistance information module 404 determines assistance information to send to the requesting wireless device 10. In certain embodiments, assistance information module 404 is capable of monitoring/sensing pilot sequences transmitted by other wireless devices. Assistance information module 404 uses the sensed pilot sequences in order to determine assistance information that will assist the request wireless device 10 in constructing another pilot sequence (different from the sensed pilot sequences). Assistance information module 404 provides the assistance information to sending module 406 for transmission to the requesting wireless device 10. As an example, the assistance information may include information for constructing a pilot sequence and optionally an indication of whether the wireless device 10 should monitor pilot sequences being sent by other wireless devices.

Certain procedures described herein may be described as selective listen-before-talk procedures (SLBT). Before transmitting an intended pilot sequence on the next available uplink time instance, a wireless device 10 (such as wireless device 10A) monitors/senses the channel (carrier sense). The wireless device 10, 10A does not consider the channel busy unless it detects the pilot sequence that wireless device 10, 10A itself intends to use. That is, wireless device 10, 10A considers the channel idle even if signal energy is detected (assuming the signal energy detected does not use the intended pilot sequence of wireless device 10, 10A).

If the SLBT procedure indicates that the channel is idle (in the sense that the intended pilot sequence is not used), the wireless device 10, 10A sends its pilot (see e.g., FIG. 2A). Otherwise, if the SLBT procedure indicates that the channel is busy, the wireless device 10, 10A would either back-off (see e.g., FIG. 4A) or send a different pilot sequence (see e.g., FIG. 3A). In certain embodiments, wireless device 10, 10A obtains assistance from access node 20 in order to construct the different pilot sequence (see e.g., FIG. 5). In certain embodiments, wireless device 10, 10A provides the access node 20 a set of detected pilot sequences, and the access node 20 assigns a suitable pilot that is not a member of this set to the wireless device 10, 10A. A suitable pilot is a pilot that is not a member of this set is a pilot that causes low interference to any of the pilots that are a member of the detected set. An example of a suitable pilot is a pilot that is orthogonal to any of the pilots in the detected set, that is, whose scalar product with any of the pilots in the detected set is zero or close to zero.

An example on how access node 20 determines the pilot sequence that is to be used by wireless device 10, 10A is that node 20 uses a predetermined set of possible pilot sequence candidates, in which each candidate sequence is a shifted sequence of a predetermined Zadoff-Chu base sequence. When wireless device 10, 10A reports the set of detected pilot sequences, the access node 20 deletes all members of the detected set from the predetermined candidate set and identifies one of the sequences remaining in the predetermined candidate set (such as the first sequence remaining in the predetermined candidate set) as the sequence that should be used by wireless device 10, 10A. For example, suppose the predetermined candidate set includes pilot sequences J, K, L, and M. If wireless device 10, 10A reports to access node 20 that it has detected other devices using pilot sequences J and L, access node 20 removes pilot sequences J and L from the predetermined candidate set and selects one of the pilot sequence remaining in the predetermined candidate set (i.e., pilot sequence K or M) as the sequence that should be used by wireless device 10, 10A.

At the access node 20, if there is a collision with the same pilot sequence because another wireless device 10B, 10C, . . . or 10N is using the same pilot sequence transmitted at the same time as the pilot sequence of wireless device 10, 10A, then this results in pilot contamination, otherwise no pilot contamination is experienced.

As discussed above, certain embodiments of this disclosure may apply to half-duplex communications and certain embodiments of this disclosure may apply to full-duplex communications. For the full duplex capable wireless device 10, 10A (e.g., FIGS. 2B, 3B, 4B), transmitting and receiving can happen at the same time. At this stage, the wireless device 10, 10A transmits its pilot sequence and simultaneously senses pilot sequence transmissions from other wireless devices in order to detect whether a similar pilot has been used. If wireless device 10, 10A does not detect other wireless devices using a similar pilot sequence, wireless device 10, 10A could continue with the same pilot sequence (e.g., FIG. 2B). Otherwise, if a similar pilot is detected, wireless device 10, 10A can back-off (FIG. 4B) or transmit a different pilot sequence (FIG. 3B). Wireless device 10, 10A may send a request to access node 20 to request assistance information for constructing a new pilot sequence. In addition, wireless device 10, 10A can report to access node 20 with a set of monitored pilots which allows access node 20 to allocate an appropriate pilot sequence to wireless device 10, 10A.

In further embodiments of the disclosure, any one of the above-described procedures, steps or processes may be implemented using computer-executable instructions, for example in the form of a computer program or computer program product, in any kind of computer languages, and/or in the form of embedded software on firmware, integrated circuits or the like.

As an example, a computer program product may comprise a non-transitory computer readable storage medium (such as memory 16) having computer readable program code embodied in the medium that, when executed by a processor 14 of a wireless device 10 (such as the first wireless device 10A) causes wireless device 10 to perform the operations described above as being performed by wireless device 10. For example, the computer program product may comprise a computer program for performing any of the functionality of wireless device 10A described with respect to FIGS. 1-7. In certain embodiments, the computer program is embodied on the non-transitory computer readable storage medium (e.g., memory 16) and comprises, for example, computer readable program code for determining (100) an intended pilot sequence that the first wireless device (10A) intends to send to an access node (20), computer readable program code for determining (110; 112-116; 218) whether another wireless device (10B; 10N) is using a similar pilot sequence, and computer readable program code for transmitting (120; 122; 124; or 126) the intended pilot sequence or a different pilot sequence to the access node (20) (wherein the intended pilot sequence is transmitted (122) in a next available time instance in response to a determination that another wireless device (10B; 10N) is not using the similar pilot sequence, and the intended pilot sequence is not transmitted (124; 126) in the next available time instance in response to a determination that another wireless device (10B; 10N) is using the similar pilot sequence).

As another example, a computer program product may comprise a non-transitory computer readable storage medium (such as memory 26) having computer readable program code embodied in the medium that, when executed by a processor 24 of an access node 20 causes the access node 20 to perform the operations described above as being performed by access node 20. For example, the computer program product may comprise a computer program for performing any of the functionality of access node 20 described with respect to FIGS. 1-7. In certain embodiments, the computer program is embodied on the non-transitory computer readable storage medium (e.g., memory 26) and comprises, for example, computer readable program code for receiving (200; 202), from a first wireless device (10A), a request for the access node to assist the first wireless device (10A) in determining an intended pilot sequence to transmit to the access node (20), and computer readable program code for sending (210; 212; 218; 220), to the first wireless device (10A), assistance information that assists the first wireless device (10A) in determining the intended pilot sequence.

It is noted that the language "operable to perform an action" may include "adapted to perform the action."

Any two or more embodiments described in this document may be combined in any way with each other. Furthermore, the described embodiments are not limited to the described radio access technologies. That is, the described embodiments can be adapted to other radio access technologies.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, the steps of any method disclosed herein do not have to be performed in the exact order disclosed, unless explicitly stated. All references to "a/an/the" element, apparatus, component, step, etc. are to be interpreted openly as referring to at least one instance of the element, apparatus, component, step, etc., unless explicitly stated otherwise.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method in a first wireless device, the method comprising:
   determining an intended pilot sequence that the first wireless device intends to send to an access node;
   determining whether another wireless device is using a similar pilot sequence;
   transmitting the intended pilot sequence or a different pilot sequence to the access node;
   wherein:
   in response to a determination that another wireless device is not using the similar pilot sequence, the intended pilot sequence is transmitted in a next available time instance; and
   in response to a determination that another wireless device is using the similar pilot sequence, the intended pilot sequence is not transmitted in the next available time instance;
   wherein the method further comprises:
   monitoring one or more channels that other wireless devices use for transmitting pilot sequences in order to detect the pilot sequences used by the other wireless devices:
   sending information about the detected pilot sequences to the access node; and
   receiving, from the access node, information to construct the different pilot sequence in order for the different pilot sequence to be different from the detected pilot sequences.

2. The method of claim 1, wherein the determining whether
   another wireless device is using the similar pilot sequence comprises:
   monitoring one or more channels that other wireless devices use for transmitting pilot sequences;
   detecting the pilot sequences used by the other wireless devices; and
   determining whether any of the detected pilot sequences match the similar pilot sequence.

3. The method of claim 2, wherein the monitoring is performed in response to receiving information from the access node, the information indicating that the similar pilot sequence is among a set of one or more pilot sequences that are potentially being used by other wireless devices.

4. The method of claim 1, wherein the transmitting comprises, in response to determining that another wireless device is using the similar pilot sequence, transmitting the different pilot sequence and not transmitting the intended pilot sequence.

5. The method of claim 1, wherein the different pilot sequence is constructed prior to determining that another wireless device is using the similar pilot sequence.

6. The method of claim 1:
   wherein the different pilot sequence is constructed after determining that another wireless device is using the similar pilot sequence; and
   further comprising obtaining, from the access node, information to construct the different pilot sequence.

7. The method of claim 1, wherein the transmitting comprises, in response to determining that another wireless device is using the similar pilot sequence, waiting to transmit the intended pilot sequence until after a pre-determined time period has elapsed.

8. The method of claim 1:
   wherein the first wireless device is configured for time division duplexing using a half-duplex configuration;
   further comprising, prior to transmitting the intended pilot sequence or a different pilot sequence to the access node, monitoring one or more channels that other wireless devices use for transmitting pilot sequences in order to determine whether another wireless device is using the similar pilot sequence.

9. The method of claim 1:
   wherein the first wireless device is configured for time division duplexing using a full duplex configuration;
   further comprising:
   transmitting the intended pilot sequence while simultaneously monitoring one or more channels that other wireless devices use for transmitting pilot sequences in or der to determine whether another wireless device is using the similar pilot sequence; and in response to a determination that another wireless device is using the similar pilot sequence, the intended pilot sequence is not transmitted in a next available time instance.

10. The method of claim 1, wherein the determining whether another wireless device is using the intended pilot sequence comprises receiving an indication from the access node that the intended pilot sequence is not being used by another wireless device and therefore the first wireless device need not monitor channels that other wireless devices use for transmitting pilot sequences.

11. The method of claim 1, wherein the similar pilot sequence is the same as the intended pilot sequence.

12. The method of claim 1, wherein the similar pilot sequence is non-orthogonal to the intended pilot sequence.

13. A method in an access node, the method comprising:
    receiving, from a first wireless device, a request for the access node to assist the first wireless device in determining an intended pilot sequence to transmit to the access node; and
    sending, to the first wireless device, assistance information that assists the first wireless device in determining the intended pilot sequence;
    wherein the request comprises one or more detected pilot sequences that the first wireless device has detected as being used by other wireless devices; and
    wherein the assistance information allows the first wireless device to construct the intended pilot sequence to be different from the detected pilot sequences.

14. The method of claim 13, wherein the assistance information comprises information to construct the intended pilot sequence.

15. The method of claim 13, further comprising:
    monitoring, by the access node, one or more channels that other wireless devices use for transmitting pilot sequences;
    detecting the pilot sequences used by the other wireless devices; and
    including, in the assistance information, information that enables the first wireless device to avoid using as the intended pilot sequence any of the pilot sequences that the access node has detected as being used by other wireless devices.

16. The method of claim 15, wherein the assistance information indicates that the first wireless device need not monitor the one or more channels that the other wireless devices use for transmitting pilot sequences.

17. The method of claim 13, wherein the assistance information comprises information about a set of one or more pilot sequences that the access node has detected as being used by other wireless devices and an indication that, if the intended pilot sequence is in the set, the first wireless device should monitor the one or more channels that the other wireless devices use for transmitting pilot sequences to determine whether the intended pilot sequence is being used by another wireless device.

18. A first wireless device, comprising:
processing circuitry configured to:
determine an intended pilot sequence that the first wireless device intends to send to an access node;
determine whether another wireless device is using a similar pilot sequence;
transmit the intended pilot sequence or a different pilot sequence to the access node;
wherein:
in response to a determination that another wireless device is not using the similar pilot sequence, the intended pilot sequence is transmitted in a next available time instance; and
in response to a determination that another wireless device is using the similar pilot sequence, the intended pilot sequence is not transmitted in the next available time instance;
wherein the first wireless device is operable to:
monitor one or more channels that other wireless devices use for transmitting pilot sequences in order to detect the pilot sequences used by the other wireless devices;
send information about the detected pilot sequences to the access node; and
receive, from the access node, information to construct the different pilot sequence in order for the different pilot sequence to be different from the detected pilot sequences.

19. The first wireless device of claim 18, wherein determining whether another wireless device is using the similar pilot sequence comprises:
monitoring one or more channels that other wireless devices use for transmitting pilot sequences;
detecting the pilot sequences used by the other wireless devices; and
determining whether any of the detected pilot sequences match the similar pilot sequence.

20. The first wireless device of claim 19, wherein the instructions are such that the first wireless device is operable to perform the monitoring in response to receiving information from the access node indicating that the similar pilot sequence is among a set of one or more pilot sequences that are potentially being used by other wireless devices.

21. The first wireless device claim 18, wherein the instructions are such that the first wireless device is operable to, in response to determining that another wireless device is using the similar pilot sequence, transmit the different pilot sequence and not transmit the intended pilot sequence.

22. The first wireless device of claim 18, wherein the different pilot sequence is constructed prior to determining that another wireless device is using the similar pilot sequence.

23. The first wireless device of claim 18:
wherein the different pilot sequence is constructed after determining that another wireless device is using the similar pilot sequence; and
wherein the instructions are such that the first wireless device is operable to obtain, from the access node, information to construct the different pilot sequence.

24. The first wireless device of claim 18, wherein instructions are
such that the first wireless device is operable to, in response to determining that another wireless device is using the similar pilot sequence, wait to transmit the intended pilot sequence until after a pre-determined time period has elapsed.

25. The first wireless device of claim 18:
wherein the instructions are such that the first wireless device is configured for time division duplexing using a half-duplex configuration;
wherein the instructions are such that the first wireless device is operable to, prior to transmitting the intended pilot sequence or a different pilot sequence to the access node, monitor one or more channels that other wireless devices use for transmitting pilot sequences in order to determine whether another wireless device is using the similar pilot sequence.

26. The first wireless device of claim 18:
wherein the instructions are such that the first wireless device is configured for time division duplexing using a full duplex configuration;
wherein the instructions are such that the first wireless device is operable to:
transmit the intended pilot sequence while simultaneously monitoring one or more channels that other wireless devices use for transmitting pilot sequences in order to determine whether another wireless device is using the similar pilot sequence; and
in response to a determination that another wireless device is using the similar pilot sequence, the intended pilot sequence is not transmitted in a next available time instance.

27. The first wireless device of claim 18, wherein the instructions are such that, in order to determine whether another wireless device is using the intended pilot sequence, the first wireless device is operable to receive an indication from the access node that the intended pilot sequence is not being used by another wireless device and therefore the first wireless device need not monitor channels that other wireless devices use for transmitting pilot sequences.

28. The first wireless device of claim 18, wherein the similar pilot sequence is the same as the intended pilot sequence.

29. The first wireless device of claim 18, wherein the similar pilot sequence is non-orthogonal to the intended pilot sequence.

30. An access node, comprising:
processing circuitry configured to:
receive, from a first wireless device, a request for the access node to assist the first wireless device in determining an intended pilot sequence to transmit to the access node; and
send, to the first wireless device, assistance information that assists the first wireless device in determining the intended pilot sequence;
wherein:
the request comprises one or more detected pilot sequences that the first wireless device has detected as being used by other wireless devices; and
the assistance information allows the first wireless device to construct the intended pilot sequence to be different from the detected pilot sequences.

31. The access node of claim 30, wherein the assistance information comprises information to construct the intended pilot sequence.

32. The access node of claim 30, wherein the instructions are such that the access node is operable to:
monitor one or more channels that other wireless devices use for transmitting pilot sequences;

detect the pilot sequences used by the other wireless devices; and include, in the assistance information, information that enables the first wireless device to avoid using as the intended pilot sequence any of the pilot sequences that the access node has detected as being used by other wireless devices.

33. The access node of claim 32, wherein the assistance information indicates that the first wireless device need not monitor the one or more channels that the other wireless devices use for transmitting pilot sequences.

34. The access node claim 30, wherein the assistance information comprises information about a set of one or more pilot sequences that the access node has detected as being used by other wireless devices and an indication that, if the intended pilot sequence is in the set, the first wireless device should monitor the one or more channels that the other wireless devices use for transmitting pilot sequences to determine whether the intended pilot sequence is being used by another wireless device.

35. A non-transitory computer readable recording medium storing a computer program product for controlling first wireless device, the computer program product comprising software instructions which, when run on processing circuitry of the first wireless device, causes the first wireless device to:

determine an intended pilot sequence that the first wireless device intends to send to an access node;

determine whether another wireless device is using a similar pilot sequence; and transmit the intended pilot sequence or a different pilot sequence to the access node;

wherein:

in response to a determination that another wireless device is not using the similar pilot sequence, the intended pilot sequence is transmitted in a next available time instance; and in response to a determination that another wireless device is using the similar pilot sequence, the intended pilot sequence is not transmitted in the next available time instance;

wherein the first wireless device is further operable to:

monitor one or more channels that other wireless devices use for transmitting pilot sequences in order to detect the pilot sequences used by the other wireless devices;

send information about the detected pilot sequences to the access node; and receive, from the access node, information to construct the different pilot sequence in order for the different pilot sequence to be different from the detected pilot sequences.

36. A non-transitory computer readable recording medium storing a computer program product for controlling an access node, the computer program product comprising software instructions which, when run on processing circuitry of the access node, causes the access node to:

receive, from a first wireless device, a request for the access node to assist the first wireless device in determining an intended pilot sequence to transmit to the access node; and send, to the first wireless device, assistance information that assists the first wireless device in determining the intended pilot sequence;

wherein:

the request comprises one or more detected pilot sequences that the first wireless device has detected as being used by other wireless devices; and the assistance information allows the first wireless device to construct the intended pilot sequence to be different from the detected pilot sequences.

* * * * *